(12) United States Patent
Tkachenko et al.

(10) Patent No.: US 12,523,646 B2
(45) Date of Patent: Jan. 13, 2026

(54) DEVICE AND METHOD FOR CELL-BASED DRUG SCREENING

(71) Applicants: The Regents of the University of California, Oakland, CA (US); CELLDOM, Inc., San Carlos, CA (US)

(72) Inventors: Eugene Tkachenko, Del Mar, CA (US); Natalia Tkachenko, Del Mar, CA (US); Edgar Gutierrez, Spring Valley, CA (US); Alexander Groisman, San Diego, CA (US)

(73) Assignees: The Regents of the University of California; CELLDOM, Inc.

( * ) Notice: Subject to any disclaimer, the term of this patent is extended or adjusted under 35 U.S.C. 154(b) by 0 days.

(21) Appl. No.: 18/497,955

(22) Filed: Oct. 30, 2023

(65) Prior Publication Data

US 2024/0060961 A1    Feb. 22, 2024

Related U.S. Application Data

(62) Division of application No. 16/178,448, filed on Nov. 1, 2018, now abandoned.

(Continued)

(51) Int. Cl.
| | |
|---|---|
| *G01N 33/50* | (2006.01) |
| *B01L 3/00* | (2006.01) |
| *B01L 99/00* | (2010.01) |
| *G01N 33/543* | (2006.01) |
| *G01N 33/58* | (2006.01) |
| *G01N 37/00* | (2006.01) |

(52) U.S. Cl.
CPC ........ *G01N 33/5008* (2013.01); *B01L 3/5085* (2013.01); *G01N 33/54306* (2013.01); *G01N 33/585* (2013.01); *B01L 3/50853* (2013.01); *B01L 2200/0668* (2013.01); *B01L 2200/0689* (2013.01); *B01L 2300/021* (2013.01); *B01L 2300/0893* (2013.01); *B01L 2300/123* (2013.01); *G01N 2500/02* (2013.01); *G01N 2500/10* (2013.01)

(58) Field of Classification Search
CPC ..... B01L 2200/0668; B01L 2200/0689; B01L 2300/021; B01L 2300/0893; B01L 2300/123; B01L 3/5085; B01L 3/50853; G01N 2500/02; G01N 2500/10; G01N 33/5008; G01N 33/54306; G01N 33/585
See application file for complete search history.

(56) References Cited

U.S. PATENT DOCUMENTS

| | | |
|---|---|---|
| 6,027,695 A | 2/2000 | Oldenburg et al. |
| 6,083,761 A | 7/2000 | Kedar et al. |

(Continued)

FOREIGN PATENT DOCUMENTS

| | | |
|---|---|---|
| CN | 105705659 A | 6/2016 |
| EP | 3601595 A1 | 2/2020 |

(Continued)

OTHER PUBLICATIONS

Advisory Action dated Jan. 12, 2022, in U.S. Appl. No. 16/178,448.

(Continued)

*Primary Examiner* — Lydia Edwards
(74) *Attorney, Agent, or Firm* — Fish & Richardson P.C.

(57) ABSTRACT

Provided are methods and compositions for cell-based drug screening with high-density arrays of conical microwells and slow-drug-release beads.

17 Claims, 16 Drawing Sheets

Related U.S. Application Data

(60) Provisional application No. 62/581,436, filed on Nov. 3, 2017.

(56) References Cited

U.S. PATENT DOCUMENTS

| | | | |
|---|---|---|---|
| 6,171,780 | B1 | 1/2001 | Pham et al. |
| 7,351,592 | B2 | 4/2008 | Storek et al. |
| 7,431,887 | B2 | 10/2008 | Storek et al. |
| 7,651,868 | B2 | 1/2010 | McDevitt et al. |
| 7,998,746 | B2 | 8/2011 | Otillar et al. |
| 8,257,967 | B2 | 9/2012 | McDevitt et al. |
| 8,859,204 | B2 | 10/2014 | Brown et al. |
| 9,611,507 | B2 | 4/2017 | Seul et al. |
| 2002/0160363 | A1 | 10/2002 | McDevitt et al. |
| 2002/0197622 | A1 | 12/2002 | McDevitt et al. |
| 2003/0012693 | A1 | 1/2003 | Otillar et al. |
| 2003/0032002 | A1 | 2/2003 | Wang et al. |
| 2003/0044969 | A1 | 3/2003 | Shin et al. |
| 2003/0064422 | A1 | 4/2003 | McDevitt et al. |
| 2003/0124029 | A1 | 7/2003 | Webb et al. |
| 2003/0170883 | A1 | 9/2003 | Martin et al. |
| 2004/0053322 | A1 | 3/2004 | McDevitt et al. |
| 2004/0063100 | A1 | 4/2004 | Wang |
| 2004/0159798 | A1 | 8/2004 | Martin et al. |
| 2005/0112277 | A1 | 5/2005 | Banerjee et al. |
| 2006/0013736 | A1 | 1/2006 | Blok et al. |
| 2006/0019264 | A1 | 1/2006 | Attiya et al. |
| 2006/0228740 | A1 | 10/2006 | Seul |
| 2008/0014631 | A1 | 1/2008 | Muraguchi et al. |
| 2008/0095673 | A1 | 4/2008 | Xu |
| 2009/0010388 | A1 | 1/2009 | Stahly et al. |
| 2010/0028935 | A1 | 2/2010 | Ciaiolo et al. |
| 2011/0046008 | A1 | 2/2011 | Love et al. |
| 2011/0086778 | A1 | 4/2011 | Herrmann et al. |
| 2011/0136677 | A1 | 6/2011 | Oldham et al. |
| 2011/0195496 | A1 | 8/2011 | Muraguchi et al. |
| 2011/0244448 | A1 | 10/2011 | Shirai et al. |
| 2011/0294678 | A1 | 12/2011 | Jin et al. |
| 2012/0135396 | A1 | 5/2012 | McDevitt et al. |
| 2012/0202709 | A1 | 8/2012 | Bergo |
| 2012/0276541 | A1 | 11/2012 | Lian |
| 2013/0260410 | A1 | 10/2013 | Johansen et al. |
| 2014/0155295 | A1 | 6/2014 | Hindson et al. |
| 2014/0176435 | A1 | 6/2014 | Jiang |
| 2014/0287402 | A1 | 9/2014 | Garrone et al. |
| 2014/0323330 | A1 | 10/2014 | Bergo |
| 2015/0017709 | A1 | 1/2015 | Brown et al. |
| 2015/0141261 | A1 | 5/2015 | Hunicke-Smith et al. |
| 2015/0145280 | A1 | 5/2015 | Kabbes et al. |
| 2015/0238956 | A1 | 8/2015 | Grouzmann et al. |
| 2016/0118915 | A1 | 4/2016 | Sawada |
| 2016/0144360 | A1 | 5/2016 | Lacey et al. |
| 2016/0145683 | A1 | 5/2016 | Fan et al. |
| 2016/0257993 | A1 | 9/2016 | Fu et al. |
| 2016/0265069 | A1 | 9/2016 | Fan et al. |
| 2016/0273032 | A1 | 9/2016 | Esfandyarpour et al. |
| 2016/0289669 | A1 | 10/2016 | Fan et al. |
| 2017/0242020 | A1 | 8/2017 | Yamauchi et al. |
| 2017/0307502 | A1 | 10/2017 | Mason et al. |
| 2018/0280918 | A1 | 10/2018 | Tkachenko |
| 2019/0137481 | A1 | 5/2019 | Tkachenko et al. |

FOREIGN PATENT DOCUMENTS

| | | |
|---|---|---|
| EP | 3601595 A4 | 12/2020 |
| GB | 2524541 A | 9/2015 |
| JP | 2016533187 A | 10/2016 |
| JP | 2017049151 A | 3/2017 |
| JP | 2020515871 A | 5/2020 |
| WO | WO-0014540 A1 | 3/2000 |
| WO | WO-0225289 A1 | 3/2002 |
| WO | WO 2004/111260 A2 | 12/2004 |
| WO | WO 2014/072432 A1 | 5/2014 |
| WO | WO-2014176435 A2 | 10/2014 |
| WO | WO-2015031691 A1 | 3/2015 |
| WO | WO 2015/145280 A1 | 10/2015 |
| WO | WO 2016/118915 A1 | 7/2016 |
| WO | WO-2018175500 A1 | 9/2018 |

OTHER PUBLICATIONS

Bose et al.; Scalable microfluidics for single-cell RNA printing and sequencing; Genome Biology (2015) 16:120.
Šeila Selimovic et al.; Microfabricated polyester conical microwells for cell culture applications; Lab Chip. Jul. 21, 2011; 11(14): 2325-2332.
EP Extended Search Report dated Nov. 17, 2020 issued in EP 18771335.9.
Fan et al.; Combinatorial labeling of single cells for gene expression cytometry; Science. 2015 Feb. 2015; vol. 347, Issue 6222: 1258367.1-1258367.8.
Gierahn et al.; Seq-Well: A Portable, Low-Cost Platform for High-Throughput Single-Cell RNA-Seq of Low-Input Samples; Apr. 2017; 14(4): 395-398.
Huang et al.; Centrifugation-assisted single-cell trapping (CASCT) in a truncated cone-shaped microwell array (TCMA) chip for the . . . ; DOI: 10.1021/acs.analchem.5b03031.
JP Office Action dated Mar. 8, 2022 issued in JP 2020-501416 [With English Translation].
Kaya et al.; Respiration activity of *Escherichia coli* entrapped in a cone-shaped microwell and cylindrical micropore monitored by scanning electrochemical microscopy (SECM); Analyst. Jun. 2004;129(6):529-34; Abstract.
Macosko et al.; Highly Parallel Genome-wide Expression Profiling of Individual Cells Using Nanoliter Droplets; Cell 161, 1202-1214, May 21, 2015.
Microgrid Arrays; www.microsurfaces.com.au/microgrid.html.
Micromesh Arrays; www.microsurfaces.com.au/micromesh.html.
Office Action for co-pending China patent application No. 2018800338207 issued Feb. 28, 2023.
PCT International Search Report dated Jul. 5, 2018 issued in PCT/US2018/023437.
Stemcell Technologies, "Technical Manual: Reproducible and Uniform Embryoid Bodies Using AggreWell™ Plates," Version 3.1.0, Document No. 29146, undated, 32 pages. www.stemcell.com.
US Final Office Action dated Aug. 3, 2020 issued in U.S. Appl. No. 15/927,057.
U.S. Final Office Action dated Dec. 22, 2022 in U.S. Appl. No. 15/927,057.
U.S. Final Office Action dated Jun. 24, 2022, in U.S. Appl. No. 16/178,448.
U.S. Final Office Action dated Jun. 30, 2023, in U.S. Appl. No. 16/178,448.
U.S. Final Office Action dated Oct. 21, 2021, in U.S. Appl. No. 16/178,448.
US Final Office Action dated Sep. 30, 2021 issued in U.S. Appl. No. 15/927,057.
U.S. Non-Final office Action dated Dec. 22, 2022 in U.S. Appl. No. 16/178,448.
U.S. Non-Final Office Action dated Jul. 6, 2023, in U.S. Appl. No. 15/927,057.
U.S. Non-Final Office Action dated Mar. 2, 2022, in U.S. Appl. No. 16/178,448.
U.S. Non-Final Office Action dated May 25, 2022, in U.S. Appl. No. 15/927,057.
US Office Action dated Jan. 13, 2020 issued in U.S. Appl. No. 15/927,057.
US Office Action dated Mar. 15, 2021 issued in U.S. Appl. No. 15/927,057.
US Office Action dated Mar. 16, 2021 issued in U.S. Appl. No. 16/178,448.
Yuan et al.; An Automated Microwell Platform for Large-Scale Single Cell RNA-Seq; http://dx.doi.org/10.1101/070193.
[No Author Listed], "Reproducible and Uniform Embryoid Bodies Using Aggrewell Plates," Stem Cell Technologies, Technical Manual, Version 3.0, Mar. 2010, 32 pages.

(56) References Cited

OTHER PUBLICATIONS

Bose et al., "Scalable microfluidics for signle-cell RNA printing and sequencing," Genome Biology, Dec. 2015, 16:1-6.
Fan et al., "Combinatorial labeling of single cells for gene expression cytometry," Science, Feb. 6, 2015, 347(6222):1258367.
Gierahn et al., "Seq-well: A portable, low-cost platform for high-throughput single-cell rna-seq of low-input samples," Nature Methods, Apr. 2017, 14(4):395.
Huang et al., "Centrifugation-Assisted Single-Cell Trapping in a Truncated Cone-Shaped Microwell Array Chip for the Real-Time Observation of Cellular Apoptosis," Analytical chemistry, Dec. 15, 2015, 87(24):12169-12176.
International Preliminary Report on Patentability in International Appln. No. PCT/US2018/023437, mailed on Oct. 3, 2019, 7 pages.
Interntional Search Report and Written Opinion in Interntioanl Appln. No. PCT/US2018/023437, mailed on Jul. 5, 2018, 8 pages.
Kaya et al., "Respiration activity of *Escherichia coli* entrapped in a cone-shaped microwell and cylindrical micropore monitored by scanning electrochemical microscopy (SECM)," Analyst, 2004, 129(6):529-534 (Abstract only).
Macosko et al., "Highly parallel genome-wide expression profiling of individual cells using nanoliter droplets," Cell, May 21, 2015, 161(5):1202-1214.
microsurfaces.com.au [online], "Microgrid Array," Jun. 30, 2014, retrieved on Mar. 13, 2024, retrieved from URL<https://microsurfaces.com.au/microgrid.html>, 3 pages.
microsurfaces.com.au [online], "Micromesh Array," Jun. 30, 2014, retrieved on Mar. 13, 2024, retrieved from URL<https://microsurfaces.com.au/micromesh.html>, 4 pages.
Office Action in Chinese Appln. No. 2018800338207, mailed on Feb. 28, 2023, 13 pages (with English translation).
Office Action in Chinese Appln. No. 2018800338207, mailed on Nov. 22, 2023, 15 pages (with English translation).
Office Action in European Appln. No. 18771335.9, mailed on Nov. 17, 2020, 7 pages.
Office Action in European Appln. No. 18771335.9, mailed on Nov. 30, 2023, 5 pages.
Office Action in Japanese Appln. No. 2020-501416, mailed on Jan. 10, 2023, 13 pages (with English translation).
Office Action in Japanese Appln. No. 2020-501416, mailed on Mar. 8, 2022, 14 pages (with English translation).
Office Action in U.S. Appl. No. 15/927,057, mailed on Nov. 22, 2023, 21 pages.
Selimović et al., "Microfabricated polyester conical microwells for cell culture applications," Lab on a Chip, Jul. 21, 2011, 11(14):2325-2332.

DEVICE AND METHOD FOR CELL-BASED DRUG SCREENING

CROSS-REFERENCE TO RELATED APPLICATIONS

This application is a division of and claims the benefit of priority to U.S. patent application Ser. No. 16/178,448, filed Nov. 1, 2018 and entitled "DEVICE AND METHOD FOR CELL-BASED DRUG SCREENING," which claims the benefit of priority to U.S. Provisional Application No. 62/581,436, filed Nov. 3, 2017, entitled "DEVICE AND METHOD FOR CELL-BASED DRUG SCREENING," each of which is incorporated herein by reference in its entirety and for all purposes.

STATEMENT OF GOVERNMENTAL SUPPORT

This invention was made with government support under HL124195 awarded by the National Institutes of Health. The government has certain rights in the invention.

BACKGROUND

In current drug screening assays in multiwell plates typical output is about 500 drugs per plate, with 3 repeats per drug.

SUMMARY

In one aspect, provided is a device comprising (i) a multiwell plate; (ii) a microwell array comprising a plurality of microwells, the microwell array located at the bottom of each well of the multiwell plate, wherein the diameter and depth of each microwell is in the range of about 30 μm to about 1 mm, e.g., 30 μm, 50 μm, 100 μm, 110 μm, 120 μm, 130 μm, 140 μm, 150 μm, 160 μm, 170 μm, 180 μm, 190 μm, 200 μm, 250 μm, 300 μm, 350 μm, 400 μm, 450 μm, 500 μm, 550 μm, 600 μm, 700 μm, 800 μm, 900 μm, 1000 μm.

In some embodiments, the size of the plurality of microwells in the microwell array may be a uniform depth and diameter.

In some embodiments, the plurality of microwells may be arranged in a hexagonal array.

In some embodiments, each microwell in the plurality of microwells may have a depth of about 150 μm and a top diameter in the range of about 100 μm to about 400 μm, e.g., 100 μm, 110 μm, 120 μm, 130 μm, 140 μm, 150 μm, 160 μm, 170 μm, 180 μm, 190 μm, 200 μm, 250 μm, 300 μm, 350 μm, or 400 μm.

In some embodiments, the microarray comprises a plurality of microwells comprising conical frustums with opening angles in the range from about 0° to about 400, e.g, about 0°, 10°, 15°, 20°, 25°, 30°, 35°, or 40°.

In some embodiments, each microwell in the plurality of microwells comprises an opening angle of about 34°, a depth of about 150 μm, a diameter at the bottom of about 50 μm, and a diameter at the top of about 130 μm.

In some embodiments, each microwell in the plurality of microwells may have an opening angle of 17°.

In some embodiments, each microwell in the plurality of microwells may have a depth of about 40 μm, a diameter at the bottom of about 7 μm, and a diameter at the top of about 24 μm.

In some embodiments, the microarray may be made of polydimethylsiloxane (PDMS) or a hydrogel, e.g., polyethylene glycol (PEG), agarose or acrylamide.

In some embodiments, the multiwell plate may be a 192-well plate, a 96-well plate, a 48-well plate or a 24-well plate.

In some embodiments, the device may further include cells at the bottom of the microwells.

In some embodiments, the device may further include a plurality of drug-eluting beads and one bead may be nestled into or sealed to a microwell of the microwell array.

In some embodiments, the drug-eluting beads may be made of a hydrogel, e.g., polyacrylamide (PAA), dextran, polyethylene oxide, UV-cross-linkable polyethylene glycol (PEG), gelatin or poly(D,L)-lactide-co-glycolide (PLGA).

In some embodiments, the drug-eluting beads may be made of a hydrocarbon polymer, e.g., polystyrene.

In some embodiments, each of the drug-eluting beads may include a drug bound to the surface of the bead.

In some embodiments, each drug-eluting bead may be uniquely labeled with one or more fluorescing nanoparticles, e.g., one or more qDots.

In some embodiments, the microwell array may include at least 8,000 microwells.

In some embodiments, the microwell array may include at least 80,000 microwells.

In some embodiments, the top surface of the microwells is not flat.

In a further aspect, provided is method of screening for drug binding or activation of a target cell, the method comprising:
  a) providing a device as described above and herein;
  b) coating target cells in isotonic solution on the bottom of the plurality of microwells;
  c) capping one or more of the microwells with a drug-eluting bead under conditions that allow drug to diffuse from the bead to the target cell; and
  d) detecting drug binding or activation of the target cell.

In some embodiments, the isotonic solution may be a cell culture medium.

In some embodiments, the methods may further include reducing the ionic strength of the isotonic medium, thereby causing the drug eluting beads to swell in the microwell.

In some embodiments, the drug-eluting bead may be uniquely labeled with one or more fluorescing nanoparticles, e.g., one or more qDots.

In some embodiments, the drug-eluting bead may be made of a hydrogel, e.g., polyacrylamide (PAA), dextran, polyethylene oxide, UV-cross-linkable polyethylene glycol (PEG), gelatin or poly(D,L)-lactide-co-glycolide (PLGA).

In some embodiments, the drug-eluting beads may be made of a hydrocarbon polymer, e.g., polystyrene.

In some embodiments, each of the drug-eluting beads may include a drug bound to the surface of the bead.

In some embodiments, target cell activity may be determined by measuring: i) drug binding and/or drug intake into the cell; ii) intracellular calcium release; iii) G protein-coupled receptor activation; iv) intracellular signaling cascades; and/or v) transcriptional activity.

In some embodiments, the methods may further include e) after (c) and before (d), exposing the microwells to fluorescence excitation and collecting fluorescence emission from the beads in the microwells.

In some embodiments, the methods may further include f) after (e), correlating the detected fluorescence emission from the beads in the microwells with the location of each drug associated with the beads in the microwells.

In some embodiments, the methods may further include g) after (d), correlating the detected drug binding or activation of the target cells in the microwells with the drug of the bead positioned in each of the microwells of the detected cells.

In some embodiments, the exposing may further include exposing the microwells to fluorescence excitation derived from a laser.

DETAILED DESCRIPTION

Figure 1:
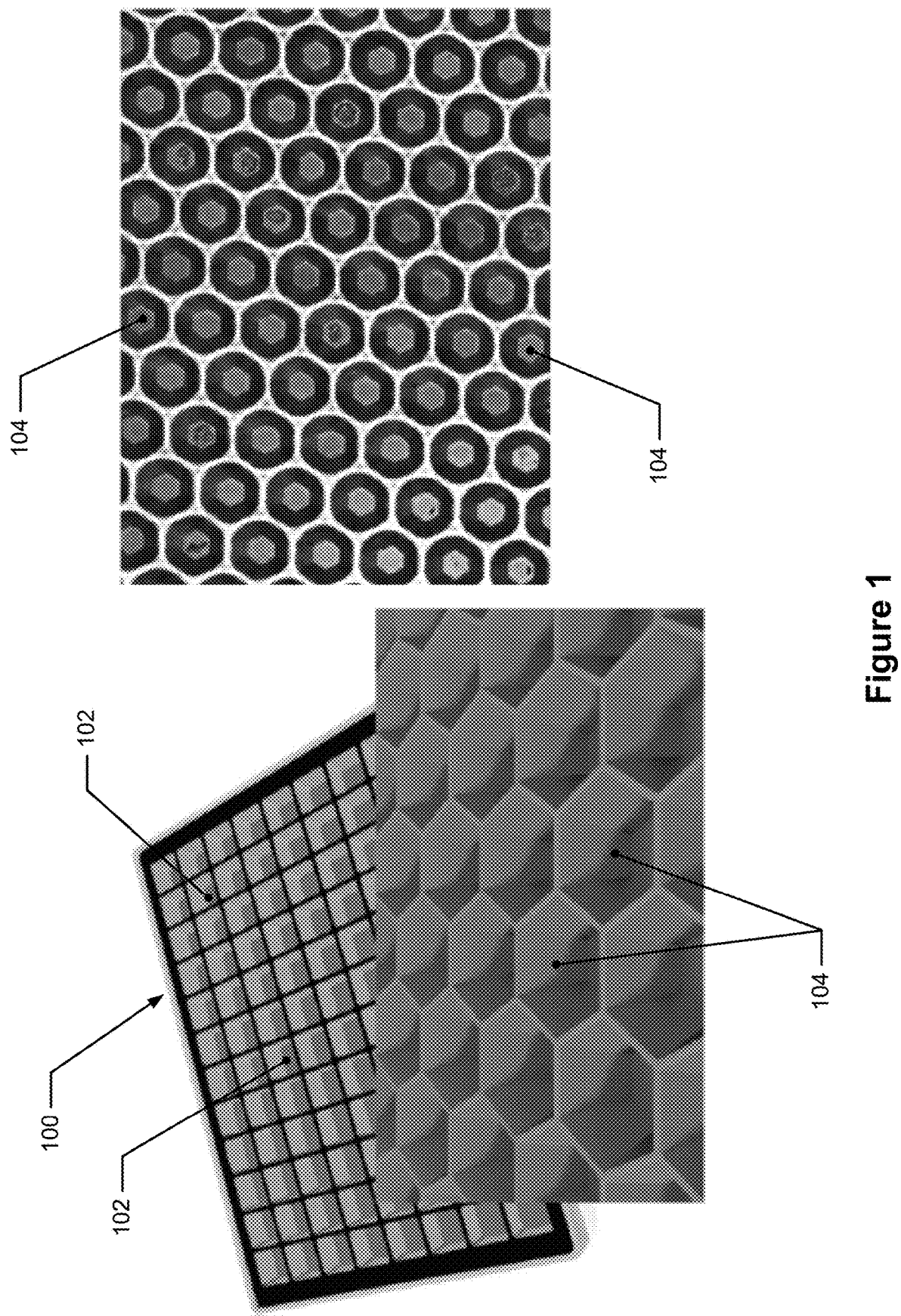
FIG. 1 illustrates arrays of conical wells.

Provided herein is a drug-screening platform for high throughput drug testing in a multi-well plate. For example, the platform may be implemented to test about 10,000 drugs, e.g., in one 96-well plate with 8 repeats per drug. The platform is based on high-density hexagonal arrays of conical microwells and barcoded porous monodisperse spherical beads, which are used as slow-release drug delivery vehicles. When monodisperse beads are loaded onto an array, only one bead can enter each microwell, and once in a microwell, a bead rests on the conical sidewalls, effectively sealing the microwell. In some implementations, conical microwells open towards the top and merge at the top of the array forming an edge that is not flat and is not a dead space. This results in nearly all cells loaded onto an array falling into microwells. Microwells may be coated to either prevent or promote cell adhesion and spreading. A drug screening assay may start with loading a cell suspension onto an array and letting cells fall into microwells. Next, barcoded porous beads carrying drugs may be loaded onto the array. A drug slowly released from a bead into the small sealed volume beneath the bead is retained in that volume for an extended time, providing prolonged exposure of cells in the microwell to the drug. At the end of an assay, beads can be removed from microwells to facilitate cell staining. The arrays and microwells may be fabricated to screen arbitrarily large numbers of drugs. For example, an array of 200 μm deep conical microwells with an opening angle of 35° and a bottom area of 20,000 μm² (to accommodate 50 adherent cells at 400 μm² per cell) has about 800 microwells in one well of a 96-well plate. With 100 different bead barcodes, 100 drugs can be tested in each well, and a 96-well plate can be used to screen 9,600 drugs, with an average of 8 microwells per drug.

The assay is based on affordable consumables, requires small numbers of cells and small amounts of drugs, and can be performed with a fluorescence scanner and standard robotics. The assay methods allow for screening of at least about 10,000 drugs in a single assay in a 96-well plate, typically, with ≥5 repeats per drug.

High Throughput Method of in vitro Drug Screening

The arrays can be made using any method known in the art. In some embodiments, the arrays are made in non-autofluorescent thermoplastic by hot embossing using a lithographically fabricated master mold with a hexagonal array of conical frustums with opening angles from 0 to 40°. In various embodiments, the arrays are made from polydimethylsiloxane (PDMS) or a hydrogel, e.g., polyethylene glycol (PEG), agarose or acrylamide. The diameter and depth of the microwells can both be readily varied, e.g., from about 30 Vim to about 1 mm; that is, the diameter may be varied between about 30 μm to about 1 mm and the depth may be independently varied between about 30 μm to about 1 mm. Another feature of the microwell arrays is that the period of an array is the same as the diameter of the microwells, resulting in the maximal use of the area of the array. In addition, the arrays have no flat regions or dead spaces at the top. Therefore, all cells or particles loaded onto an array fall into microwells (FIG. 2). One particular version of the arrays has microwells with an opening angle of 34° and a depth of about 150 μm, expanding from 50 μm at the bottom to 130 μm at the top (FIG. 2). This version of the microwell arrays can find use for clonal propagation of stem cells and for growing small populations of cells as spheroids for high-throughput screening. In some embodiments, the arrays can be made in thin (e.g., about 0.5 mm thick) sheets of thermoplastic and attached to commercial bottomless 24- and 96-well plates. For the 24- and 96-well plates, one well has, respectively, up to about 9,000 and up to about 2,100 microwells at the bottom. Because of the conical shape and relatively large ratio of the microwell depth to diameter, cells in microwells are effectively shielded from mechanical perturbation by flow in the well. Therefore, medium in a well (of the multiwell plate) can be exchanged without dislodging cells from microwells.

Monodisperse beads can be made from of a variety of materials, including hydrogels. There are published protocols for making large batches of polyacrylamide (PAA) beads using microfluidic devices. In various embodiments, the beads have an average diameter in the range of about 30 μm to about 250 μm beads.

The drug screening methods described herein are based on the arrays of conical microwells and on monodisperse beads made of hydrogel (or another porous or slowly soluble material) and labeled with "barcodes". In various embodiments, the microwells could be as in FIG. 1 or 2-3 times greater in size (260-390 μm in diameter), with the same shapes and proportions, and the beads could be 100-300 μm in diameter. In some embodiments, the hydrogel beads serve as slow-release drug delivery vehicles (see FIG. 3). In various embodiments, the drug is a small organic compound, e.g., a small organic compound that qualifies under Lipinski's rule of five, e.g., a drug that is known in the art, e.g., a drug that is listed in the Physician's Desk Reference. In the beginning of an assay, cells are loaded onto the microwell array, e.g., on the bottom of a well of a 96-well plate (see FIG. 2A). Cells are evenly distributed over the area of the array (see FIG. 2A) and are loaded at a concentration resulting in a small number of cells per microwell. The average number of cells may be large enough to ensure a reliable drug screening readout from nearly all microwells, but small enough so cells fit into microwells and do not overconsume nutrients. Aliquots of suspensions of barcoded beads soaked in N=about 100 different drugs are mixed together and dispensed into the same well of the 96-well plate, making sure that the beads are evenly distributed over the area of the microwell array (see FIG. 3). For nearly all beads to end up in microwells, the number of beads may be smaller than the number of microwells. For example, there may be 3 beads per 4 microwells.

In some embodiments, the density of the hydrogel material of the beads is such that, when a bead soaked in a solution of drug (small molecule) to saturation is placed into cell culture media, it takes the drug a considerable time to diffuse out of the bead. The lower bound on the diffusion time is that it is substantially longer than the cumulative time of taking and mixing the aliquots and loading beads into microwells, such that beads reach microwells without losing a significant portion of the drugs. The upper bound is the desired duration of exposure of cells in microwells to the drug.

The hydrogel density and drug diffusion coefficient inside beads can be adjusted by varying the molecular weight and concentration of PAA in the pre-polymer mixture (e.g., about 9%) and by doping the mixture with non-reactive high-molecular-weight polymers (e.g., PAA, dextran, or polyethylene oxide). In addition, instead of PAA, beads can be made out of UV-cross-linkable polyethylene glycol (PEG), with its concentration varied from 5 to 40%. Furthermore, for a given type of bead material, the drug release time scales as the bead diameter squared, varying 9-fold between 100 µm and 300 µm beads.

Several factors can be considered to influence that, during an assay, the maximal concentration of drug at the bottom of the microwell (where cells are located) is on the same order as its initial concentration in the bead and that the dynamics of drug concentration around cells closely follows the dynamics of the release of the drug from the bead.

(1) The absorption of the drug into the material of the microwell array should be low.
(2) The volume of the medium between the bead and microwell bottom should be substantially smaller than the volume of the bead. This can be accomplished by adjusting the geometry of the microwells and size of the beads.
(3) The bead seals the microwell tightly, with the gaps between the bead and the sidewalls so small that the cumulative diffusion of small molecules of the drug through the gaps is weaker than the diffusion through the bulk of the bead. Both PAA and PEG are polar polymers, and a minor reduction in the ionic strength of the medium (by medium exchange), when beads are in wells, will cause beads to swell, tightly sealing the microwells. Such a triggered swelling of beads by a reduction in the ionic strength is likely to make them more porous and increase the diffusivity of drugs in them. Therefore, it may have an added benefit of initiating the drug release at the time when beads are already in microwells (given that the beads are initially so dense that the drug release is excessively slow).

Numerical simulations indicate that with the microwells as in FIG. 2 and 100 µm beads, the maximal concentration of drug around cells reaches ~40% of the original concentration in the bead, and becomes closer to the original concentration in the bead, as the volume of the medium between the bead and the microwell bottom is further reduced.

Figure 6:
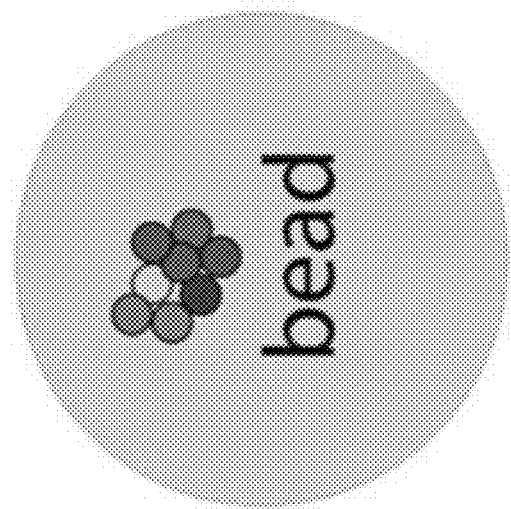
FIG. 6 illustrates Spectra of emission of qDot particles that are excited with 405 nm light.
Figure 6:
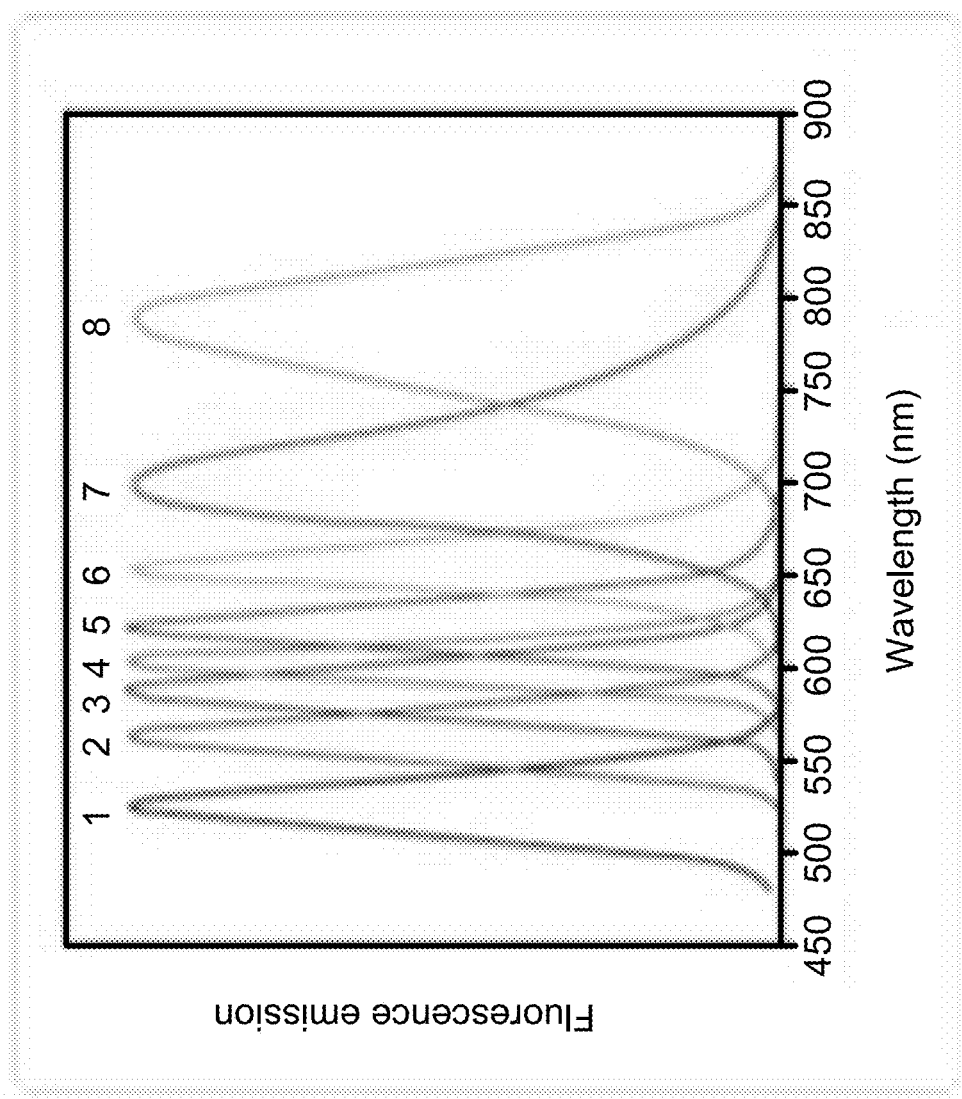

The hydrogel beads, while otherwise identical, are barcoded, carrying one of N ~100 different combinations of labels. So, for all beads dispensed into one well of the 96-well plate, there is a 1 to 1 correspondence between the drug and barcode carried by the bead. In some implementations, barcoding involves binary encoding using 6-8 types of qDot particles, which are all excitable at the same wavelength, but have different spectra of emission (see FIG. 6). As seen in FIG. 6, eight types of qDots particles were excited using the same wavelength and have different spectra of emission, such as qDot 1 having an emission between about 500 and 550 nm and qDot 8 having an emission between about 750 nm and 850 nm. The qDots of a given type may be either added to the hydrogel prepolymer mixture at a concentration corresponding to a relatively large average number of qDots per bead or not added at all, corresponding to 1 bit of encoding per 1 type of qDots. With n different types of qDots, the number of different combinations of labels (barcodes) is N=2n, which is 64 and 256, respectively, for 6 and 8 different types of qDots. Because qDots tend to be very bright, sufficient fluorescent light is expected to be collected from beads in microwells even when they are photographed with a low-NA, large depth-of-field objective lens. With fluorescence excitation derived from a laser (e.g., 405 nm) and a laser-blocking filter in the emission optical train, a standard 3-color camera may be sufficient to analyze the fluorescence emission spectrum for the presence of a particular type of qDots. Qdot® Probes are known in the art, and commercially available, e.g., from ThermoFisher Scientific™ at thermofisher.com. Therefore, by having each qDot associated with a different bead, each bead can be identified based on the detected fluorescence emission. For example, referring to FIG. 6, if each qDot is associated with a different bead, then the detected emissions can be correlated to the qDot and its associated bead. In FIG. 6, if emissions are detected at 575 nm and 700 nm, then this indicates that qDots 2 and 7 have been detected and thus the beads associated with these two qDots have been detected.

For a drug screening assay, all drugs of interest may be divided into sets of N. For each drug from a given set, beads with identical barcodes are soaked in a vial with the drug. During an assay, aliquots of bead suspensions taken from the drug vials from a given set of N are mixed together and dispensed into one well of the 96-well plate with the microwell array, as described above. So, one well is used to screen one set of N drugs, and a single 96-well plate can then be used to screen 96×N drugs, which is ~6,000 for N=64 and ~24,000 for N=256.

Doubling the size of the beads results in quadrupling the drug release time (for a given drug and bead material). In addition, the volume of a bead defines the volume of medium available to cells in the well during the drug release time, and doubling the diameter of beads increases the medium volume 8-fold. Because there is a lower limit on the number of cells in the well (to ensure reliable readout and to reduce the coefficient of variance of the cell number), larger microwells and proportionally larger beads are beneficial for maintaining composition of cell medium constant, especially if the intended drug release time is long. The size of the microwells can be a selected based on (1) the number of readily distinguishable barcodes (e.g., corresponding to an average of fewer than 5 beads of a given type in a well), (2) the desired range of drug release times, (3) limitations on the material properties of beads (diffusion coefficient of drugs), and (4) the desired numbers of cells in microwells.

The devices and methods presented herein enable larger screens with primary cells, which improve disease models compared to widely used immortalized cell lines; they also are able to speed up the high-content screening, thus allowing time for more detailed image acquisition and facilitating deep learning to characterize cell responses. The speed and efficiency of drug discovery are elements of success for pharmaceutical companies. It is desirable to streamline and enhance the predictability of the identification stage of drug discovery. Further explanation of the devices and methods is provided below.

As discussed above, some embodiments include arrays of microwells in conjunction with size-matching monodisperse porous beads that are labeled with fluorescent barcodes. The microwells may be conical in shape and the barcodes may be the qDots described herein. The beads may be porous, pre-soaked in different drugs, and sized such that one bead enters a microwell and rests on the sidewalls, such as conical sidewalls, of the microwell thereby sealing the microwell, and becoming a slow-release vehicle for drug delivery from the bead to cells in the microwell. In alternative embodiments, the beads may have drugs bound to the exterior of the beads and photocleaving may be used to detach the drug from the bead. Unlike traditional cell-based drug-screening assays in multi-well plates, the microwells of the present disclosure may host a minimal population of cells that is expected to produce reliable drug response readouts, thus increasing the density of the array to a practical maximum, and minimizing the number of cells used in an assay. As a result, in some embodiments, the number of drugs screened per plate may be increased by a factor of 50, as opposed to traditional screening methods, and enables the use of primary cells for large-scale screenings.

Traditional assays that may use microwells do not use beads that each carry a unique drug. Instead, conventional assays use a volume that contains one drug and beads that all contain the same drug. The devices and methods described herein use beads that each have a unique drug and expose the cells in each microwell to the unique drug carried by the one bead sealed in that microwell. For example, aliquots of suspensions of barcoded beads soaked in N=about 800 different drugs are mixed together and dispensed into one well, of a 96-well plate, that contains 800 microwells allows for 800 assays per well because each different, unique drug is eluted to the cells of just one microwell. The devices and methods described herein enable this in part by being configured such that one bead seals to one microwell and only that one drug is eluted or otherwise released to the cells in that microwell. This may enable at least about 80,000 assays to be performed for a single 96-well plate. Moreover, traditional assays use either oil or air on top of microarrays, but these techniques do not allow for long term cell culturing, such as for hours or days which are enabled by the present disclosure. In some embodiments described herein, each well of a multi-well plate may have at least 800 microwells, 833 microwells, 8,000 microwells, 8,333 microwells, 80,000 microwells, or 83,333 microwells.

Further detail is provided below with reference to FIGS. 1-14. FIG. 1 illustrates arrays of conical wells of a multiwell plate. As can be seen, the multiwell plate 100 includes 96 wells 102 and each well has an array of microwells 104 that may be, as shown in FIG. 1, conically shaped. The right side of FIG. 1 is a top view photograph of a section of microwells. The diameter of the opening of each microwell 104 is larger than the diameter of the bottom of the microwell as further illustrated in FIG. 7.

Figure 7:
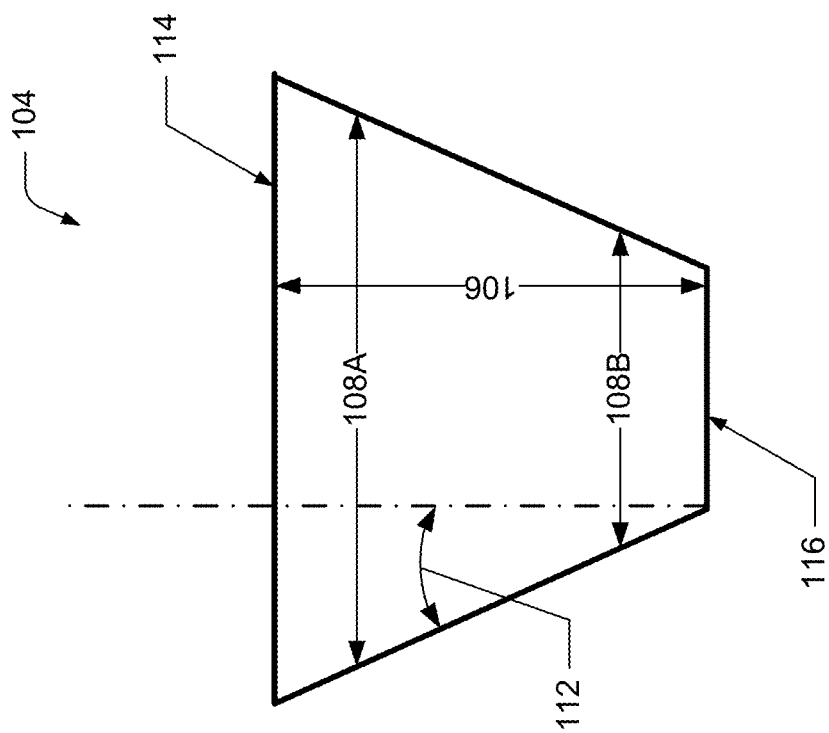
FIG. 7 depicts a top view and side view of a single microwell of FIG. 1.
Figure 7:
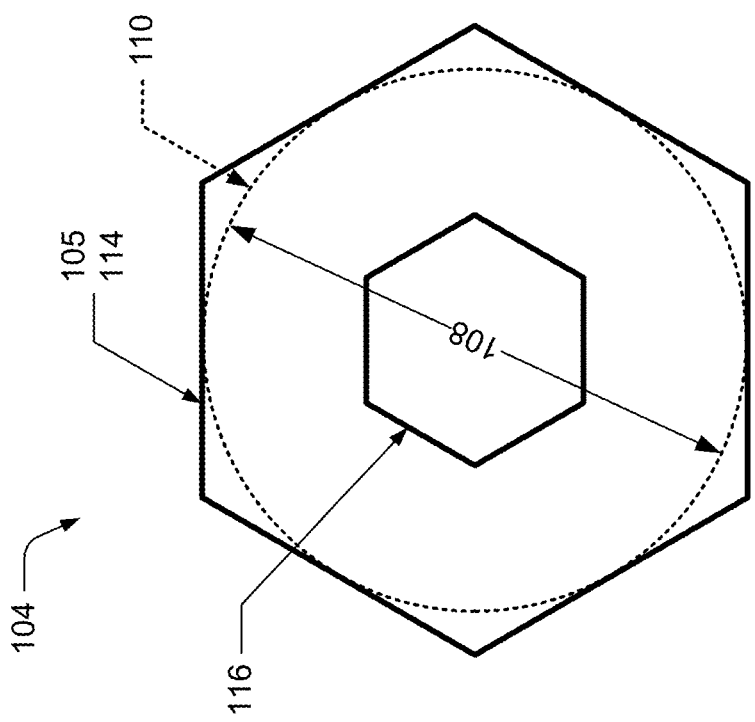

The cross-sectional shape of the microwells, taken in a plane perpendicular to the depth of the microwell, may have different geometric configurations. For example, FIG. 7 depicts a top view and side view of a single microwell of FIG. 1. As can be seen, in the left side depicting the top view, the cross-sectional shape 105 of the microwell 104 from FIG. 1, taken in a plane perpendicular to the depth 106 of the microwell 104, is a hexagonal shape 105 with six sidewalls. The cross-sectional shape of each microwell may be considered to have a diameter as stated above, which may be considered a nominal diameter 108 that forms a circle 110 that is tangential to all sides of the cross-sectional shape 105 as illustrated in FIG. 7. This diameter 108 may vary along the depth 106 of the microwell 104 such that the microwell 104 forms a conical shape with the bottom of the microwell having a smaller diameter than the top, or opening, of the microwell. On the right side of FIG. 7, depicting a side view, the microwell 104 has a varying diameter 108 along the depth 106 with the largest diameter at the opening 114, the smallest diameter smallest diameter is at the bottom 116, and diameter 108A larger than diameter 108B. As described above, these microwells may be conical frustums with opening angles from 0 to 40°, including about 170 and 18°; FIG. 7 indicates one open angle 112 that is within this range. In addition to those listed above, the diameter of the bottom of each microwell may be at least 7 μm, the top diameter may be at least 24 μm, the height may be at least 40 μm, and the opening angle may be at least 170 and these microwells may seal with beads that may be about 15-18 μm in diameter.

In some embodiments, the beads may have spherical shapes and uniform diameters thereby providing for consistent and reliable sealing of microwells. In some embodiments, the beads are porous and have an efficient absorption and slow release of small molecules with a range of chemical properties, and the beads may include approximately 1,000 different, in some embodiments, readily distinguishable fluorescent labels (barcodes). Drugs may be loaded into porous beads by soaking them in a medium with the drug and the drugs may be released because of the bead porosity. In some other embodiments, the drugs may be bound to the surface of the beads and these drugs may be released using photocleavage.

As noted above, the beads may be made of a hydrogel, e.g., polyacrylamide (PAA), dextran, polyethylene oxide, UV-cross-linkable polyethylene glycol (PEG), gelatin or poly(D,L)-lactide-co-glycolide (PLGA). Such beads may be considered porous such that drugs or other compounds may be absorbed by the beads and then released by the porous beads into the microwell. In some embodiments, droplets of a PEG-gel may be injected into a prepolymer oil thereby creating a micro-emulsion. The prepolymer may include various components, such as a PEG-diacrylate (PEGDA) which may include and a photo-initiator. The prepolymer with the PEG gel droplets may be exposed to UV-light which can transform these droplets into beads by cross-linking PEGDA. The beads may have spherical shapes that may vary in diameter by +10 μm, and in some embodiments, may vary by about 10% of each other, or about 5% of each other. Drugs may be loaded into the hydrogel beads by soaking or onto the hydrogel beads through surface binding. In some embodiments, drugs may also be loaded onto other types of beads, like hydrocarbon polymers, such as polystyrene beads, through surface binding.

As described herein, the drugs or other molecules loaded into or onto the beads are eluted into cells within the microwells. For beads into which drugs are loaded (e.g., by soaking), these beads may have a time of diffusion (also referred to herein as "diffusion time", "elution time", "diffusion time $t_{1/2}$", or "$t_{1/2}$") which may represent the time that a material within the bead may diffuse out of the bead. The diffusion time may be determined by various methods, including soaking the beads in fluorescence material that is absorbed by the beads; because the beads are porous, the fluorescence of the beads gradually decreases over time and the rate of this decrease may be measured to determine the time of diffusion. FIG. 4 depicts an illustration of slow drug release as measured by fluorescent intensity of the beads. In the left side of FIG. 4, a cross-sectional diagram of beads 428 loaded into microwells 404 with cells 420 is depicted and is similar to FIG. 3A. Each bead may have a different fluorescent dye as described herein and the microwells may be photographed after the beads are loaded into the microwells. As seen in the right side of FIG. 4, the drugs, as represented by the dyes, are slowly released from beads into microwells as indicated by decreasing intensity of fluorescence of the beads over time. This concept is described in greater detail below.

In some embodiments, it may be desirable to have beads with well-defined values of diffusion time $t_{1/2}$ for numerous small-molecule compounds that are faster than conventional techniques. For instance, current cell-based drug screening assays have an incubation time ranging from 4-48 hrs, while some embodiments of the methods and apparatuses described herein utilize beads that release drugs into microwells between about 3 to 24 hrs, including about 12 hrs. This diffusion time of porous beads into microwells may be different than, but correlated with, the measured diffusion time of beads in a different structure, such as a solution between glass plates.

Figure 8A:
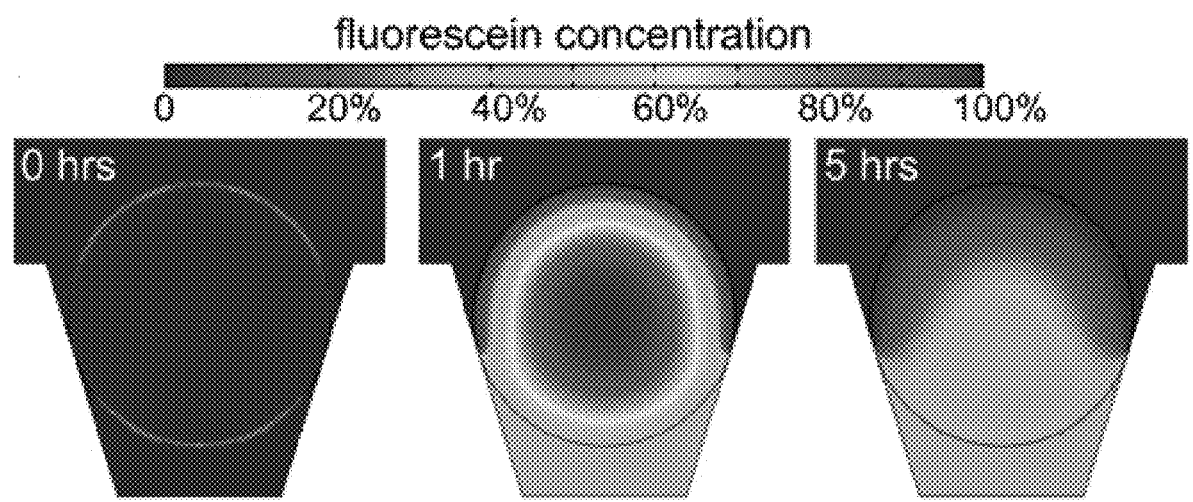
FIGS. 8A and 8B depict numerical simulations of the release of fluorescein from 225 μm diameter porous beads into a conical microwell.
Figure 8B:
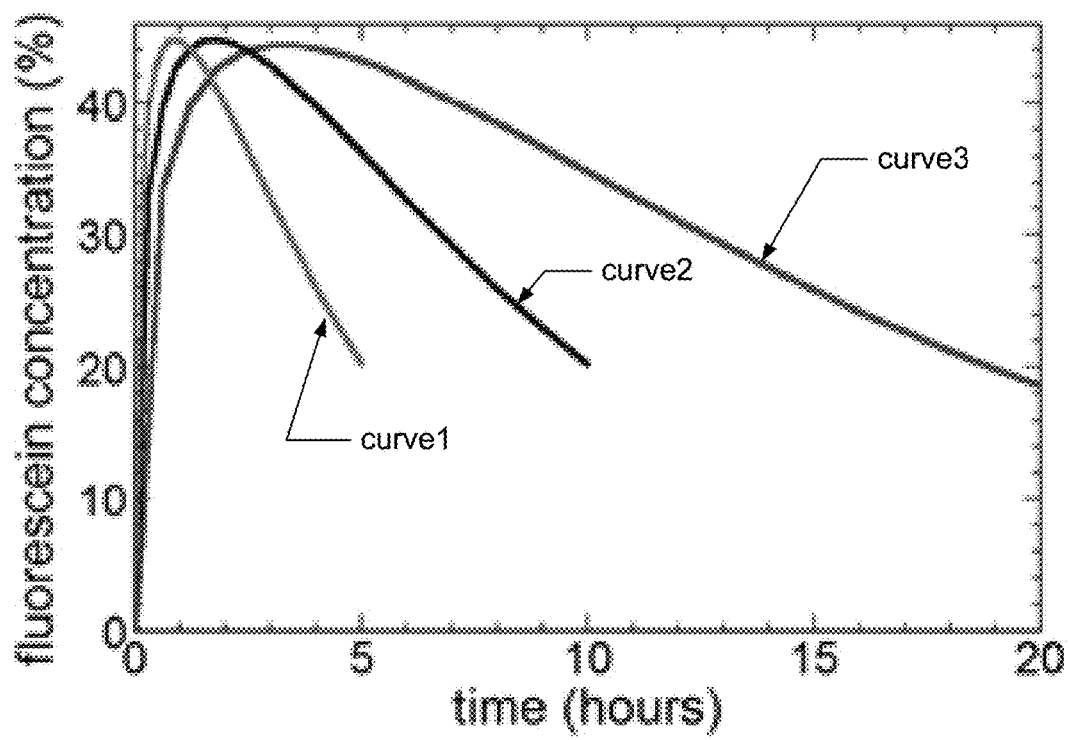
Figure 10:
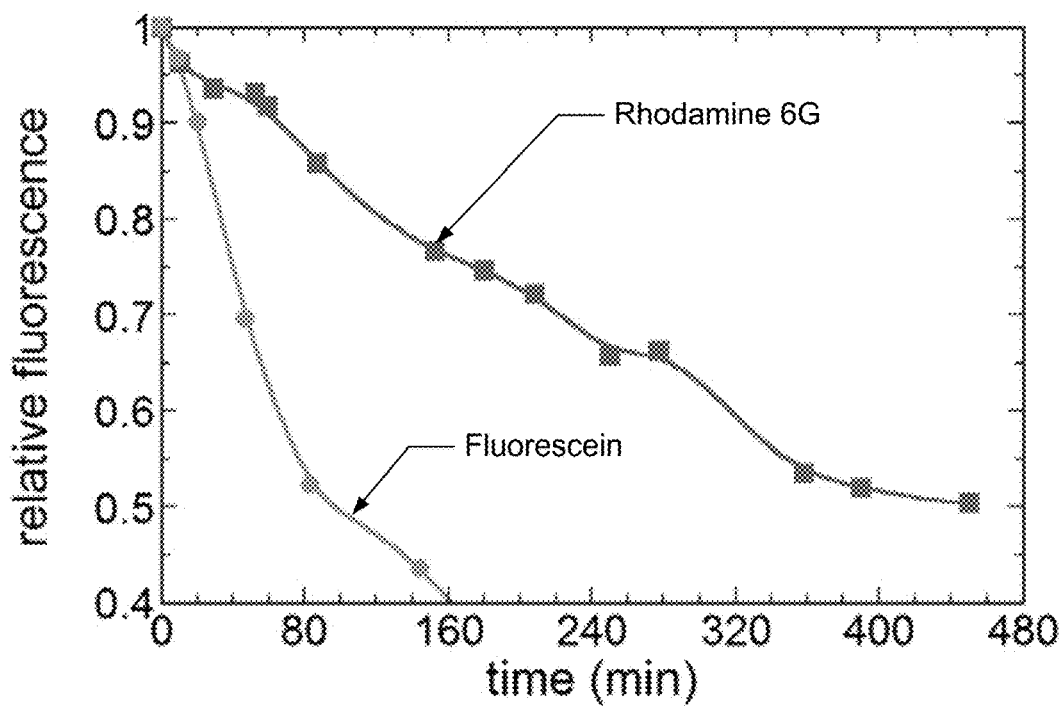
FIG. 10 depicts fluorescence of a PEG bead pre-soaked in fluorescein and rhodamine 6G as functions of time.

For instance, FIGS. 8A and 8B depict numerical simulations of the release of fluorescein from 225 μm diameter porous beads into a conical microwell. In FIG. 8A, shading distribution of fluorescein at different time points for a fluorescein diffusion coefficient in the bead $D_b$=0.125 μm$^2$/s. In FIG. 8B, the concentration of fluorescein under the bead as a function of time for beads with diffusion coefficients ("$D_b$") of 0.25 μm$^2$/s (curve1), 0.125 μm$^2$/s (curve2), and 0.0625 μm$^2$/s (curve3) is depicted. As discussed below with respect to FIG. 10, the diffusion time of the same porous beads between glass plates was measured. When these diffusion times in FIGS. 10 and 8B are compared, the diffusion time of the porous beads in a microwell (FIG. 8B) is approximately 6 times longer than the diffusion time of the porous beads in between glass plates (FIG. 10). Based on this, measurements may be taken of bead diffusion time in glass plates, and increased by this multiplier, in order to determine the diffusion time in a microwell. Therefore, in some embodiments, to obtain a diffusion time of beads in microwells of about 3 to 24 hours, the diffusion time of beads in a solution as measured between plates may be set to about 1-4 hours. Additional details of these numerical simulations are discussed below.

The diffusion times of porous beads may be adjusted in various ways, such as adjusting the composition of the beads as well as by introducing chemical modifications to the beads. Like described above, it was found that changing the percent composition of PEG in the beads affected the diffusion time of the beads. Additionally, chemical modifications may affect the diffusion times. For instance, the acrylate functionality of PEGDA beads may be used to change the diffusion time. The PEGDA beads may be doped with acrylate-terminated hydroxyls (methacrylate-PEG-OH), which may reduce the interaction of lipophilic molecules with PEG matrix and thus reduce the diffusion time for these molecules.

As noted above, the beads may be barcoded with unique identifiers in order to determine the locations of each bead, and thus the locations of each drug associated with those beads, in the microwells. The barcoding of beads may be performed in various ways. For instance, fluorescent labels may be incorporated into the beads during bead production or chemically bound to the bead surface. In some embodiments that attach a fluorescent label to the surface of the bead, fluorescent nanospheres impermeable to small molecules may be used in order to avoid quenching the fluorescence of unprotected dyes that may be caused by small molecules. One or more aspects of the beads may then be chemically functionalized in order to assist with attaching the fluorescent nanospheres to the beads. Mixtures of fluorescent nanospheres may be produced in various ways. In some embodiments, mixtures having different proportions of yellow-green, dark-red (e.g., 660/680 nm), and non-fluorescent nanospheres (e.g., 40 nm carboxylated nanospheres, commonly known as "Invitrogen"), may be used. In some such embodiments, the mixtures may have 0, 1, 2, or 4 parts of the yellow-green nanospheres and 0, 1, 2, or 4 parts of the dark-red nanospheres, which can result in 16 possible combinations of barcodes of yellow-green and dark-red fluorescence. This may result in well-defined and independently varied levels of fluorescence in two different channels. In some embodiments, additional fluorescent nanospheres may be added, such as red-green (e.g., 488/685 nm) and red-orange (e.g., 565/580 nm) which may result in over 1,000 different combinations with blue, yellow-green, dark-red, and red-orange nanospheres at 0, 1, 2, 4, 8 or 16 parts of each.

In order to detect beads with these different barcodes, the beads may be mixed together and imaged with a device configured to detect the fluorescence of the beads. For example, this may include imaging and detecting the yellow-green and dark-red fluorescence in each of the two channels. In some embodiments, the beads may be photographed under a fluorescence microscope with sets of filters optimized for yellow-green and dark-red fluorescence, and cumulative fluorescence of individual beads may be measured in each of the two channels. After this detecting, the fluorescence measurements may be analyzed by making a 2D plot, or map, with each bead represented by a dot in the coordinates of its fluorescence in the yellow-green (x-axis) and dark-red (y-axis) channels. The dots may form 16 compact clusters with no overlap in the 2D space, thereby enabling the reliable identification of the 16 fluorescent barcodes. This enables the unique barcodes to be identified and the locations of the beads and their associated drugs to be determined. As discussed herein, these locations can be used to determine which bead and drug caused cell activity in which microwell.

As mentioned above, in some embodiments, quantum Dots (qDots) may be used to label the beads. qDots are very bright and stable, and might be a preferable option for some optical systems that may detect qDots better than fluorescent nanospheres.

Figure 2A:
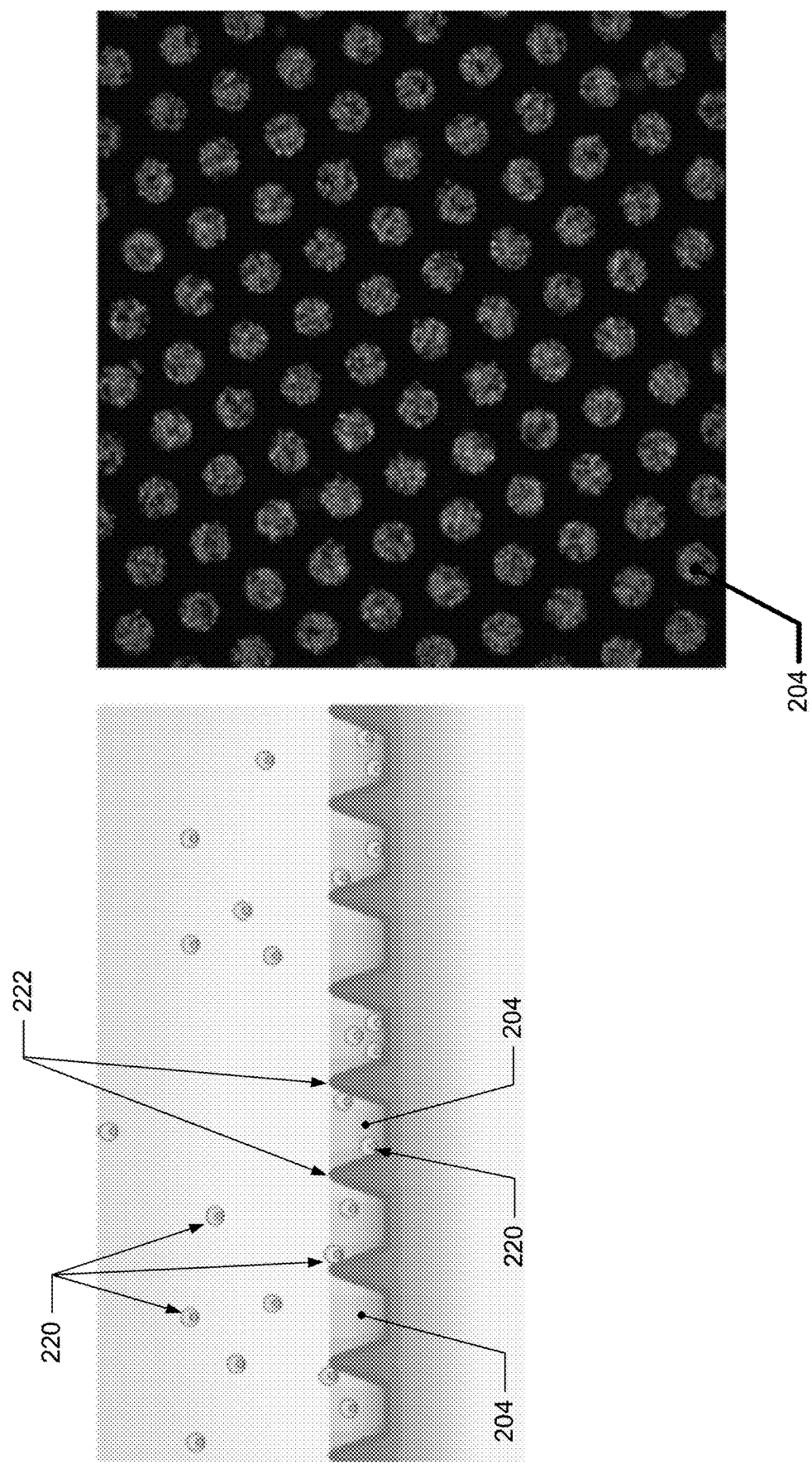
FIGS. 2A-2B illustrate cell loading.
Figure 2B:
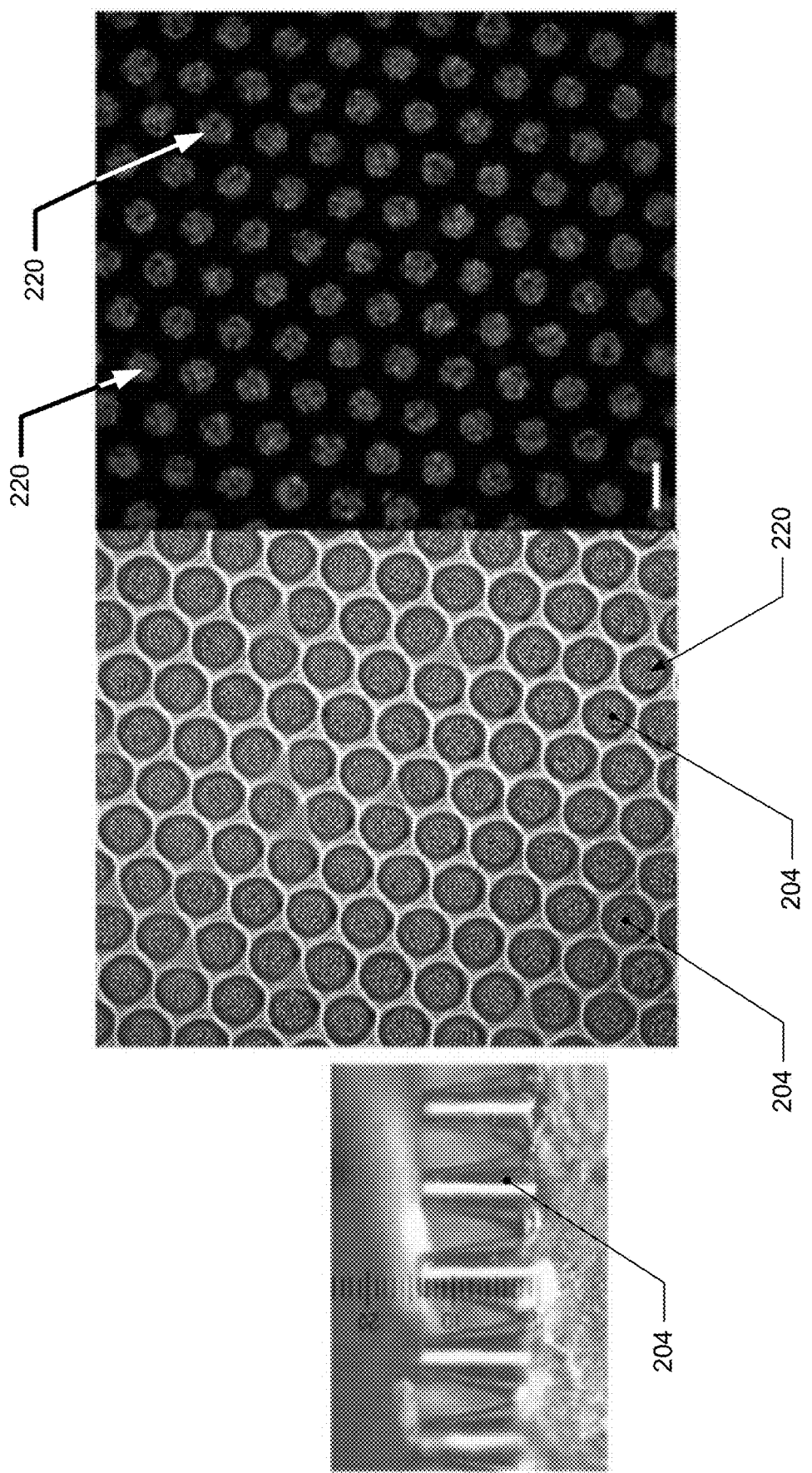

Cells and beads may be sequentially loaded into the microwells, like described above. Liquid containing the cells may be flowed into the microwells after which the beads may be flowed into the microwells. The left side of FIG. 2A depicts a cross-sectional side view of cells 220 loaded into microwells 204. As can be seen, the top surface 222 of the microwells array has no flat, horizontal surfaces, so all cells 220 fall into microwells 204. The right side of FIG. 2A depicts a top view image of cells loaded into microwells 204. The left side of FIG. 2B depicts a cross-sectional magnified image of a microwell, with a vertical scale in μm. The center and right sides of FIG. 2B depict bright field and fluorescence top views, respectively, of Ramos cells plated onto a microwell array, cultured for 6 hrs, and live (green 224)/dead (red 226) stained. Scale bar is 100 μm and the period of the microarray is 130 μm. As can be seen, there are no cells in-between microwells.

Uniform loading of cells, beads, or both may be implemented in various ways. In some embodiments, one or more strainers may be positioned above the bottom of the microwells. The strainers may be comprised of a polymer, such as a plastic, and may have holes that are sized to enable beads, cells, or both, to pass through the holes, such as about 0.5 mm in diameter. The strainers may be positioned at various heights above the microwells, including about 2 mm from the bottom of microwells. In some further or alternative embodiments, a multi-well plate having square wells, as opposed to round wells, may be used. In some instances, each square well may be about 7 mm by 7 mm. Both of these embodiments may disrupt vertical flow, circular flow, or both, within the wells in order to cause uniform loading of cells, beads, or both within the microwells of the wells.

Figure 3A:
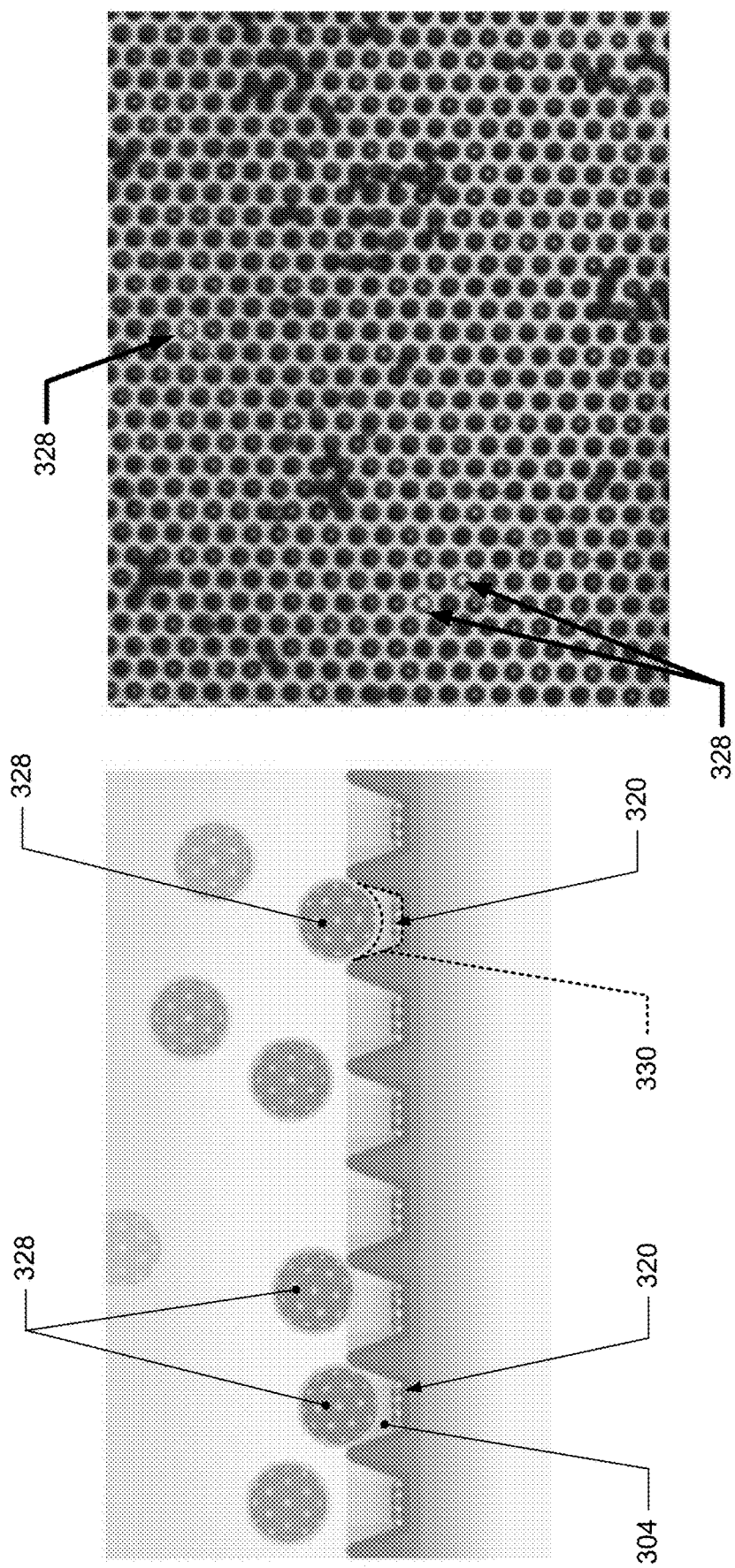
FIGS. 3A-3B illustrate bead loading.
Figure 3B:
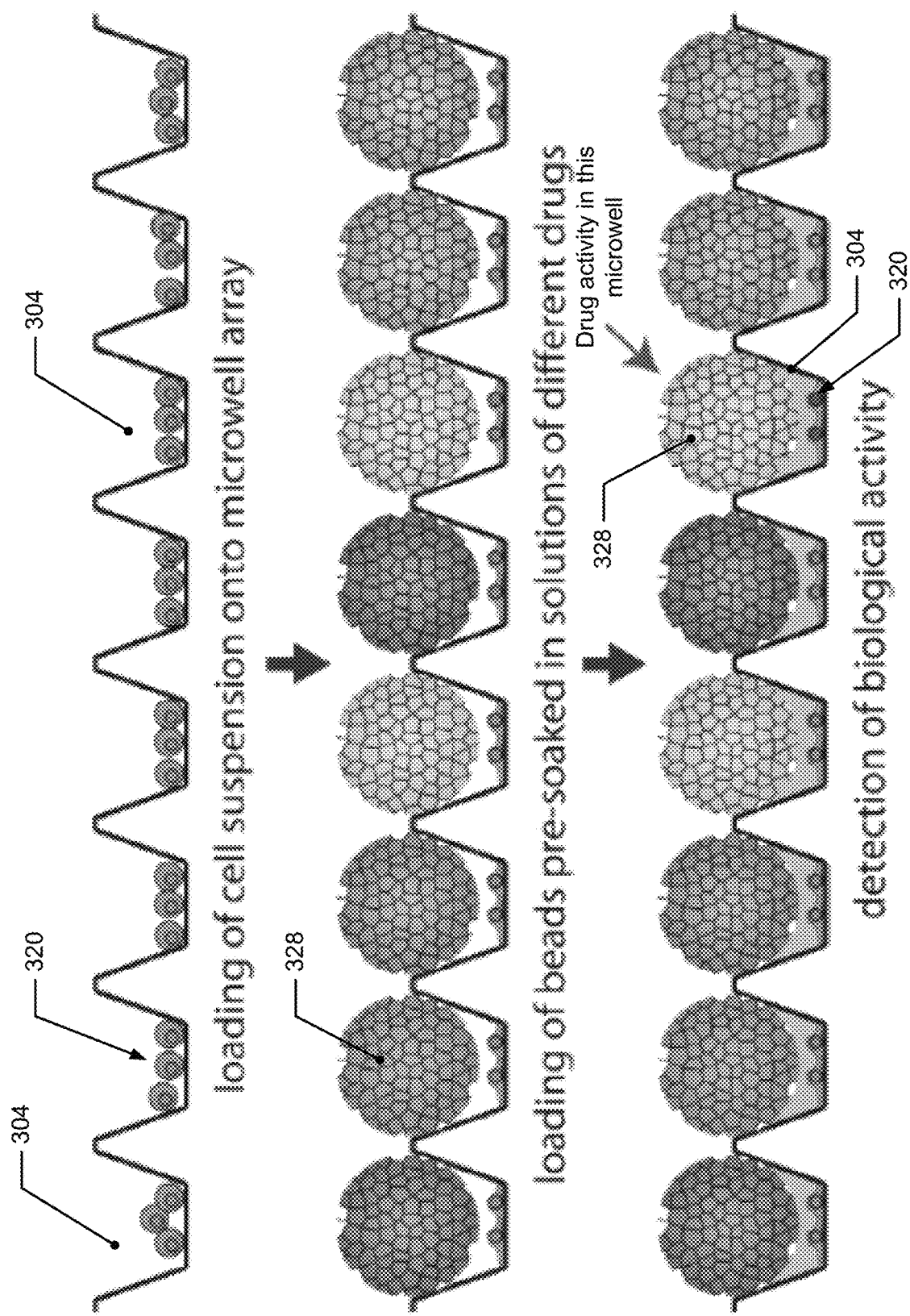
Figure 4:
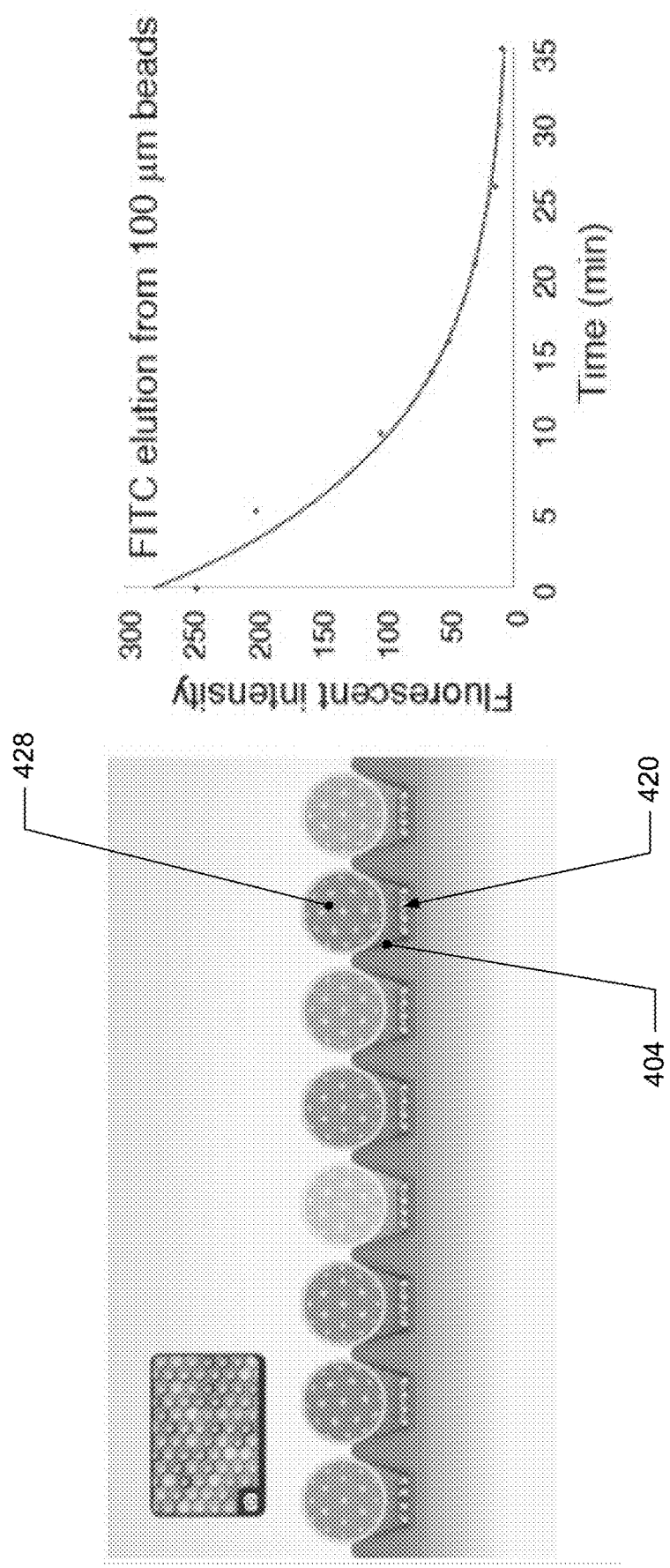
FIG. 4 illustrates slow drug release

FIG. 3A depicts bead loading into microwells. The left side of FIG. 3A depicts a cross-sectional schematic like in FIG. 2A, but with fluorescence-coated porous beads 328 that are used as drug delivery vehicles. In this Fig., the beads 328 fit tightly into microwells 304 that contain cells 320, sealing the microwells 304 from the top. FIG. 3A also illustrates the small sealed volume 330 of the microwell 304 beneath the bead 328 that includes the cells 320. In some embodiments, there is a 1:1 correspondence between drugs and fluorescence codes as described above. The right side of FIG. 3A depicts a top view image with three beads 328 sealed in three microwells. FIG. 3B depicts a schematic of the drug-screening assay with an array of conical microwells and slow-release beads. In the first step, the microwells 304 are loaded with cells 320, in the second step, the drug-containing beads 328 are loaded into and sealed with the microwells 304, and in the third step, the biological activity is detected as described above and as indicated by the arrow.

Figure 3C:
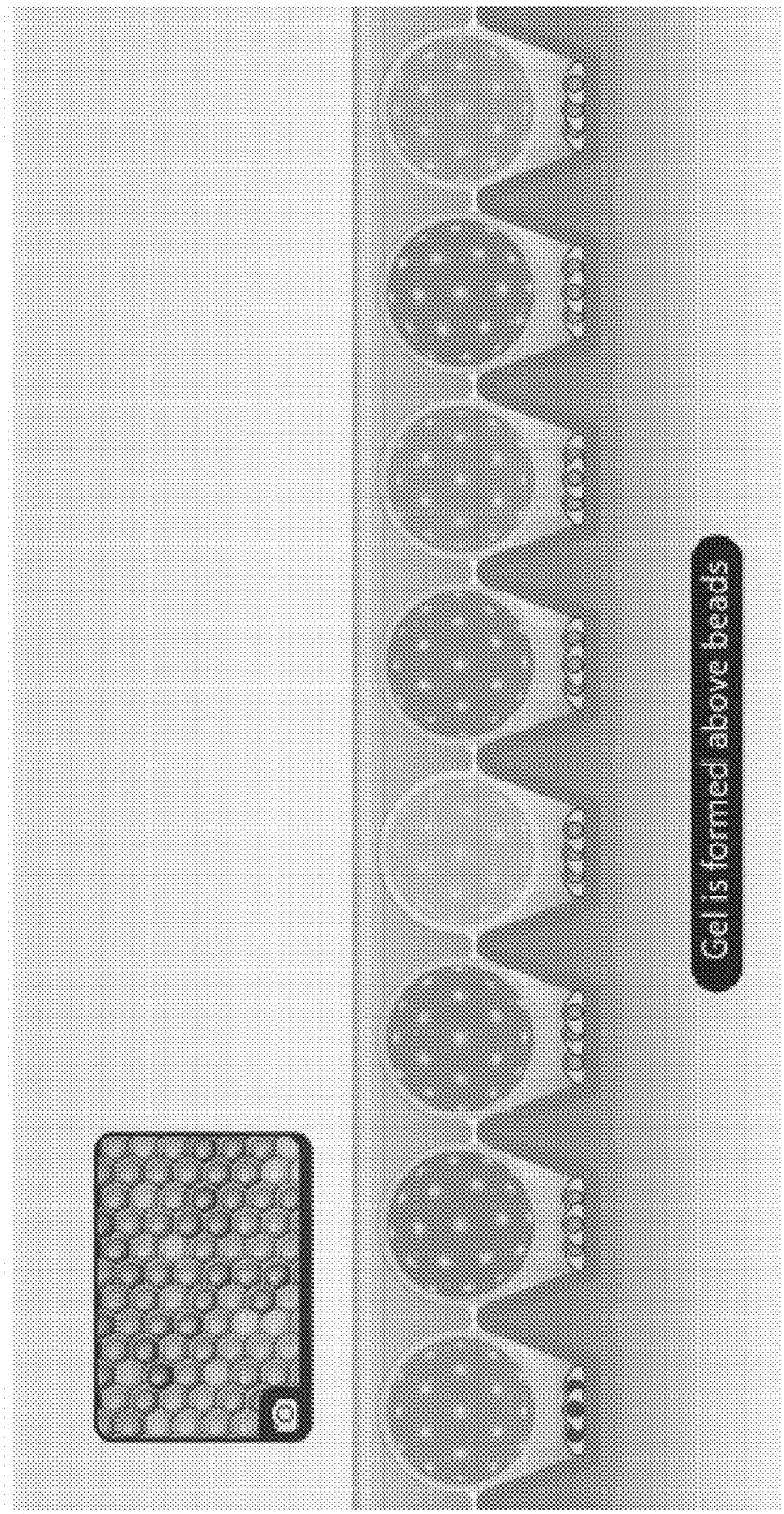
FIGS. 3C-3D illustrate bead removal using a monolith formed over the beads.
Figure 3D:
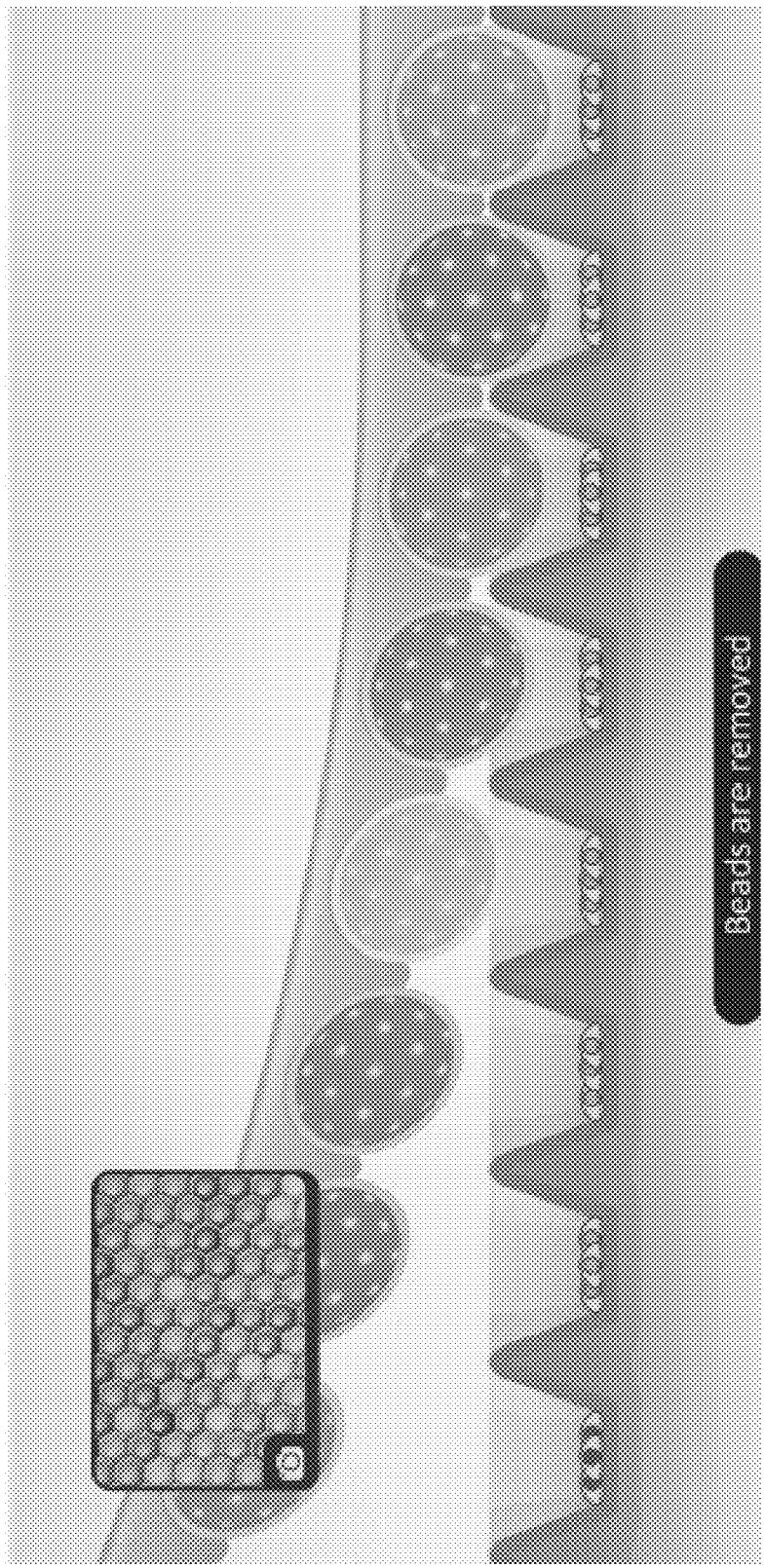

The beads may be removed from the microwells at the end of an assay in numerous manners. For instance, a solution may be added to the wells of the multi-well plate which is configured to make the beads positively buoyant and a force may be applied to the multi-well plate that causes the solution under the beads in order to facilitate their removal. This may include adding a solution that changes the density of the medium in which the beads are positioned. Alternatively, and as depicted in FIGS. 3C and 3D, a liquid hydrogel pre-polymer may be poured over the array and allowed to solidify and form a monolith with the hydrogel beads that are still in the microwells. This monolith is then detached from the microwell array and lifted. When the lifted monolith hydrogel is turned upside down, its top side has an array of beads that retain their original spatial order in the microwell array. Therefore, individual beads in the array can be readily tied to the wells of the microwell array that these beads used to cap (without identifying any tags or markers on the beads). The molecular content of beads in the array can be analyzed by an ELISA-like technique or by spatially resolved Mass-spectrometry (MALDI).

Figure 5:
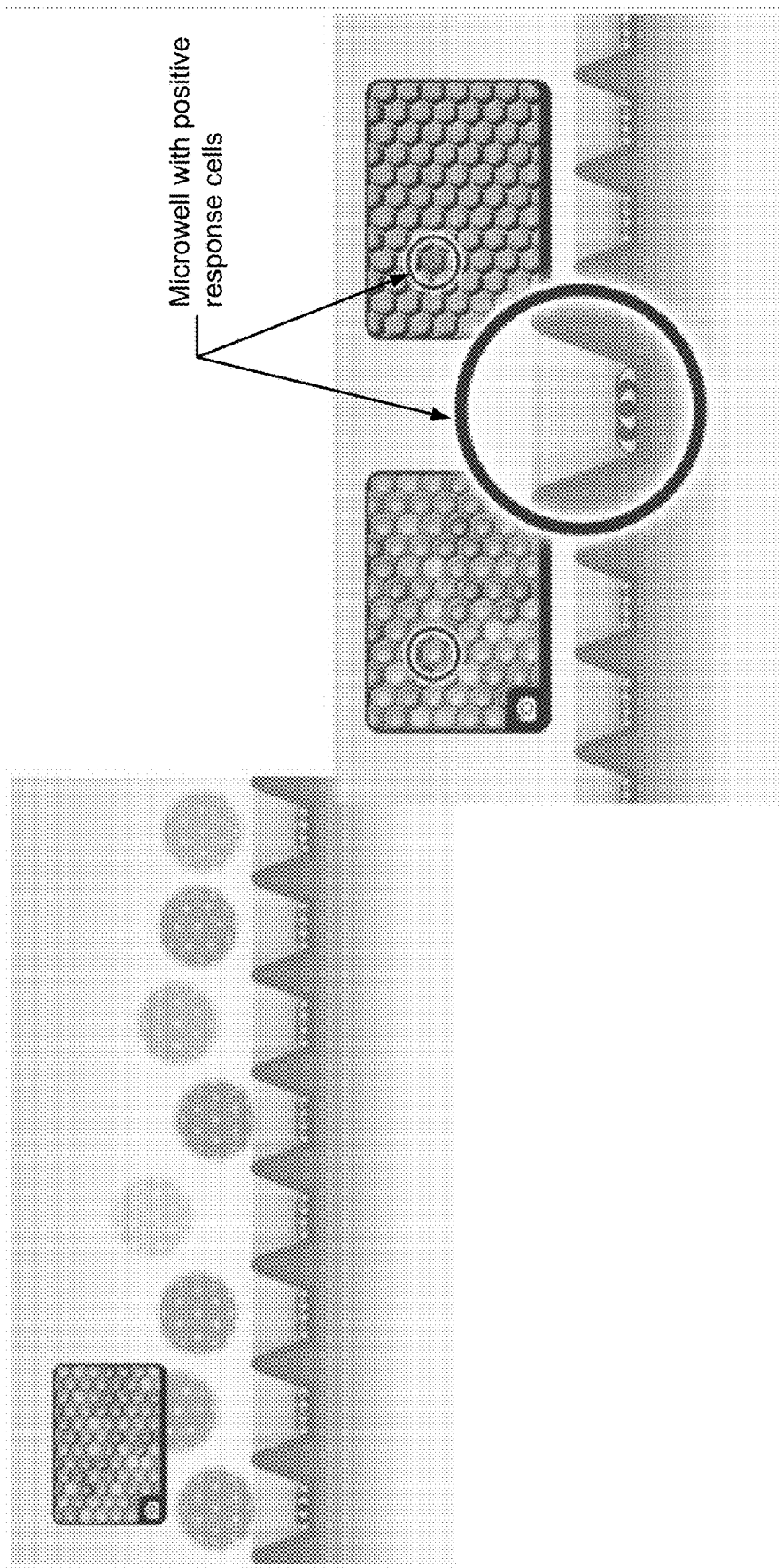
FIG. 5 illustrates cell staining and imaging.

Once the beads are removed from the microwells, the cells may be stained and imaged in order to detect positive response cells. In FIG. 5, the left side depicts cells being removed from the microwells, after which the cells are stained and imaged as indicated in the right side of FIG. 5. As described herein, microwells with positive-response cells are detected and then matched or correlated to the individual beads that were loaded into each of these microwells using the previously described location detection of the unique qDot associated with each bead and its corresponding location in each microwell.

In some embodiments, the surface of the microwells may have properties that promote adhesion of cells, growth of cells, or both. This may include the surface of the microwells themselves or a coating on the surface of the microwells. In some such embodiments, a molecular coating may be applied to the surface of microwells that promotes both adhesion and growth of cells. The molecular coating may comprise a protein, a cell matrix protein, collagen I, fibronectin, laminin, or may comprise an amino acid, such as a positively charged amino acid poly-L-lysine. The molecular coating may be chosen based on the cells that are positioned into the microwells, such as HeLa (a human solid cancer-derived cell line) cells, NIH/3T3 (a mouse fibroblast cell line) cells, and RAMOS (a human lymphoma-derived cell line) cells. For some cells that may be non-adherent and grow in a suspension, the molecular coating or other surface treatment of the microwells may have little to no effect on the growth of these cells and such coating may not be used. Additionally, the microwells may be comprised of various materials, such as different types of thermoplastic material. In some implementations, the thermoplastic that is used may be based on determinations that the thermoplastic material is not cytotoxic to the cells.

In some embodiments, the sealing of the microwell by the bead may affect the cells positioned in the microwell. This may include, for instance, limiting the access of cells in the microwell to nutrients and other molecules from the media above the bead which may in turn lead to cell starvation and a change in pH around the cells. In some such instances, pH buffers may be made stronger than generally used and the nutrient content of media may be increased compared to that generally used. These adjustments may be based on duration of the assay, cell type, and porosity of the beads.

The dynamics of cell exposure to drugs carried by beads and the cross-talk between cell media in adjacent microwells may be determined and adjustments to the microwells, beads, or both, may be made. Cells in microwells may be exposed to different concentrations of a dye which may become fluorescent inside the cell and may accumulate in cells in an amount proportional to its concentration in the medium and to the incubation time. Drug delivery by beads may be determined, like described above, by soaking beads with fluorescent barcodes at various concentrations of the dye. Cells incubated in media with different concentrations of the dye may be used as controls. An array of microwells may be loaded with a mix of placebo beads and beads containing various dye concentrations and the intensity of fluorescence in cells may be examined at various times under a microscope. After a total time, such as 48 hrs, the beads may be removed as described above and cells may be imaged again. As stated above, the beads may be adjusted to change the drug delivery to cells in the microwells.

The possible contamination from beads that are not in microwells may also be determined and adjustments to the microwells, beads, or both may be made. In some such instances, cells may be loaded and cultured as described above and an array of microwells may be loaded with placebo beads that will enter and seal microwells with cells. After that, a mixture of beads containing various dye concentrations may be loaded and may be positioned on top of the previously loaded placebo beads. The intensity of fluorescence in cells in placebo bead-sealed microwells at various distances from beads carrying different concentrations of dye may be examined under a microscope at various times as described above. Contamination of the cells in the microwells by dye-carrying beads may be indicated by the cells having increased levels of fluorescence than with no exposure to the dye.

If it is determined that cross-talk between adjacent microwells or cross-contamination from beads above the microwells exists, then various adjustments may be made. This may include tightening the sealing of microwells by beads by applying a low-speed centrifugation, by modifying the microwells and beads as described above (e.g., changing the diameter of the beads or the geometry of the microwells), and by reducing the number of beads that may rest on top of the beads in microwells.

EXAMPLES

The following examples are offered to illustrate, but not to limit the claimed invention.

Example 1

Drug Screening Assay

In an illustrative drug screening assay, all drugs of interest are divided into sets of N. For each drug from a given set, beads with identical barcodes are soaked in a vial with the drug. During an assay, aliquots of bead suspensions taken from the drug vials from a given set of N are mixed together and dispensed into one well of the 96-well plate with the microwell array. So, one well is used to screen one set of N drugs, and a single 96-well plate can then be used to screen 96×N drugs, which is ~6,000 for N=64 and ~24,000 for N=256. The method is demonstrated at muwells.com/content/drug_screening.php.

Example 2

Microwells and Beads

In one example, an array of conical microwells was produced with each microwell having a 200 µm depth, 140 µm diameter at the bottom, and an opening angle of 34°. Approximately 40 cells may be plated into the bottom of each of these microwells, with each cell having a footprint of 400 µm² per cell. These microwells were each sealed by a 225 µm diameter beads.

Figure 9:
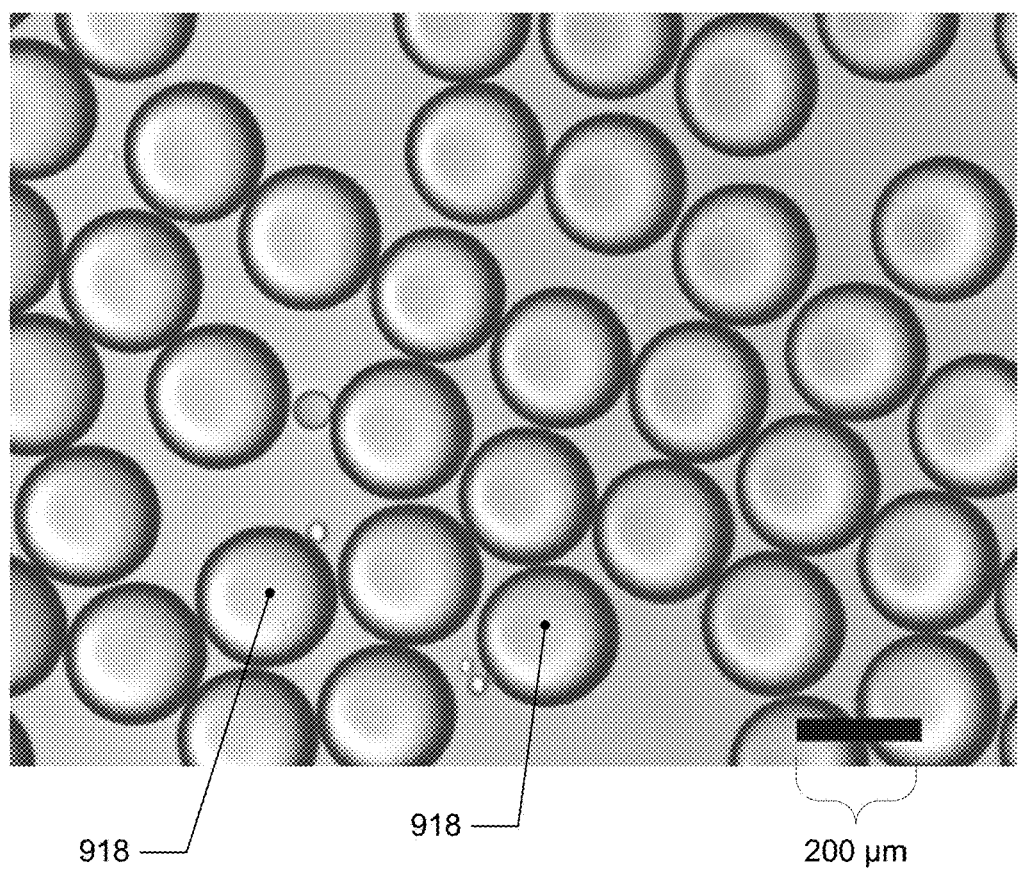
FIG. 9 depicts a photograph of spherical beads 918 that are approximately 225 μm in diameter.

In one instance, beads having a diameter of approximately 225 µm were made of a polyethylene glycol (PEG) hydrogel by injecting droplets of PEG-gel prepolymer into oil, thereby producing a micro-emulsion. The prepolymer contained 40% of PEG-diacrylate (PEGDA; 700 kDa; Sigma-Aldrich) and a photo-initiator. The exposure of the droplets to UV-light transformed droplets into beads by cross-linking PEGDA. The examination of the beads under a microscope indicated that they had nearly perfect spherical shapes with diameters varying by ±10 µm. FIG. 9 depicts a photograph of spherical beads 918 that are approximately 225 µm in diameter.

Aliquots of this bead suspension (with beads having 40% PEG content) were soaked overnight in solutions of fluorescein and rhodamine 6G, washed in a buffer, and plated on cover glasses under about 5 mm layers of buffer, and the fluorescence of individual beads was measured as a function of time under a microscope. The diffusion of dyes from beads into buffer led to a gradual reduction of their fluorescence. The time $t_{1/2}$ after which the cumulative fluorescence of a bead decreased to 50% of its initial level was used as a measure of the time of diffusion. FIG. 10 depicts fluorescence of a PEG bead pre-soaked in fluorescein and rhodamine 6G as functions of time. Here in FIG. 10, the square points indicate the rhodamine 6G while the circles represent the fluorescein and their decreasing fluorescence over time. As can be seen, the fluorescein decreased to 50% of its fluorescence in about 90 min. while the rhodamine 6G reduced to 50% of its fluorescence in about 420 min. The molecular weights of fluorescein and rhodamine 6G were 332 Da and 479 Da, respectively, and their diffusion coefficients in water are 425 µm²/s and 414 µm²/s, respectively. Therefore, the approximate 4.5-time difference in $t_{1/2}$ between the two molecules may be because of their different chemical properties (fluorescein is hydrophilic, whereas rhodamine is lipophilic) and different interactions with the PEG matrix of the beads. A batch of beads with 20% PEG content was also made and it was discovered that the value of $t_{1/2}$ for fluorescein was approximately 4 times shorter than for 40% PEG beads, indicating that the rate of diffusion of small molecules out of beads can be adjusted by varying the PEG content of the beads.

Example 3

Adjustment of Bead Diffusion Time

In some experiments, beads made out of solutions with 700 Da PEGDA concentrations >40% were not viable beads for some embodiments. In some other experiments, beads prepared with 40% 700 Da PEGDA did not provide sufficiently long $t_{1/2}$ and thus beads were made with PEGDA having molecular weights of 250 Da or 575 Da which produced beads with smaller pore sizes and thus acceptably long $t_{1/2}$.

Example 4

Fluorescent Barcoding of Beads

Figure 11:
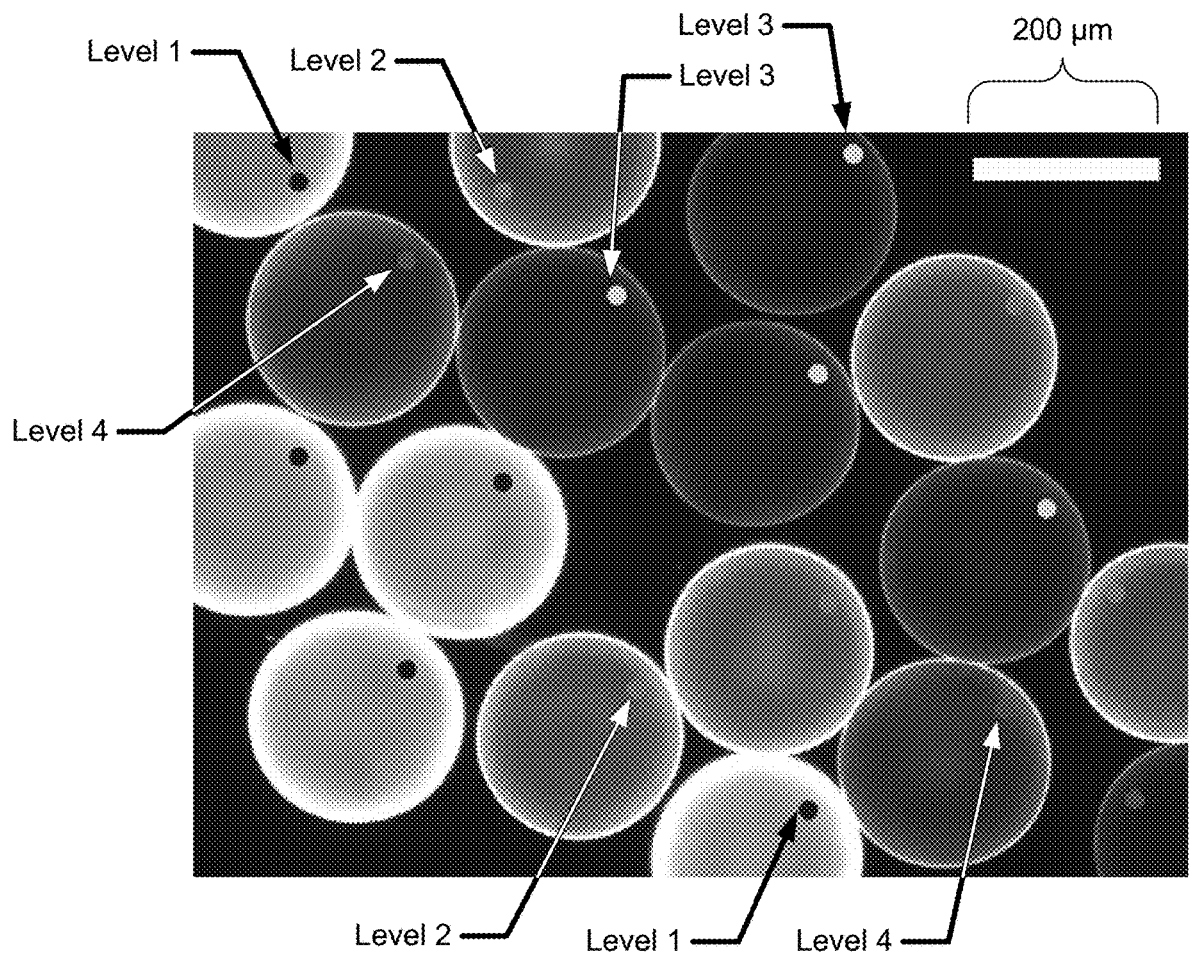
FIG. 11 depicts a photograph of beads and four levels of fluorescence.

In some experiments, fluorescent nanospheres impermeable to small molecules were attached to beads in order to barcode the beads. Here, PEG hydrogel beads were chemically functionalized by binding reactive primary amines to PEG and then covalently attaching carboxylated yellow-green fluorescent nanospheres (40 nm size, 505/515 nm, from LifeSciences). A batch of amine-functionalized 225 µm PEG beads was split into four aliquots and incubated with mixtures of the fluorescent nanospheres and plain carboxylated 40 nm nanospheres prepared at ratios of 1:7, 2:6, 4:4, and 8:0 in order to obtain PEG beads with relative levels of fluorescence of 1, 2, 4, and 8. An inspection of a mixture of these four types of beads plated on a coverglass under a fluorescence microscope indicated that the procedure produced beads with four readily distinguishable levels of fluorescence. FIG. 11 depicts a photograph of beads and four levels of fluorescence; PEG beads with 225 µm diameter are seen and two examples of each of the four levels of fluorescence is identified.

Example 5

Loading and Unloading of Beads and Cells

Figure 12:
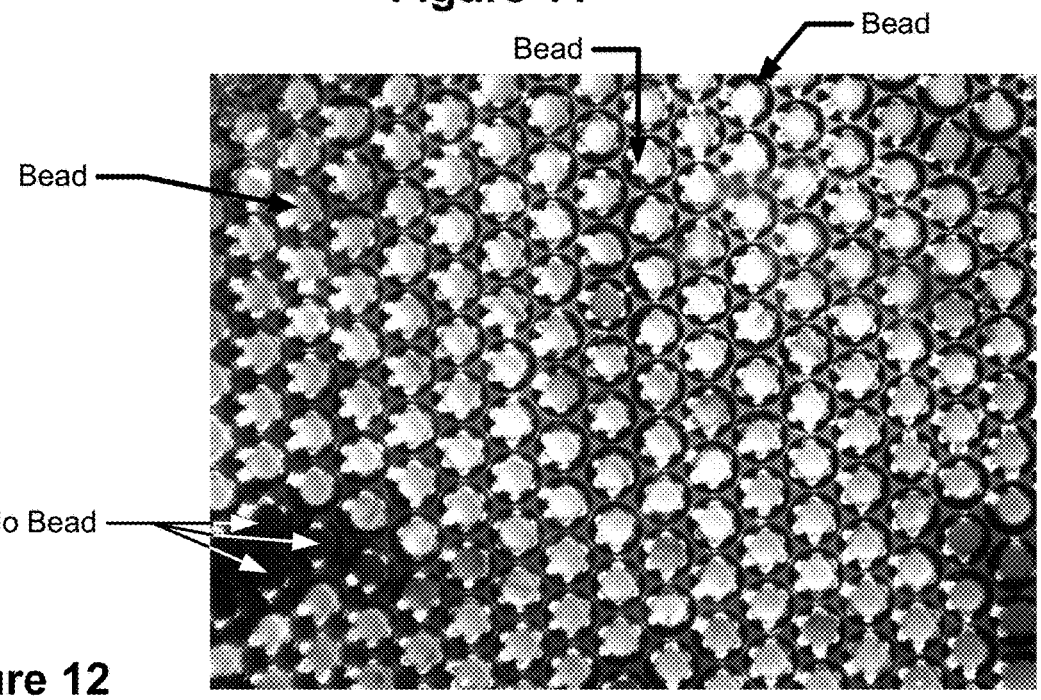
FIG. 12 depicts a photograph of numerous beads loaded into microwells using both strainers and square wells.

In some experiments, plastic strainers with approximately 0.5 mm diameter holes were positioned about 2 mm above the well bottoms and cells and beads were loaded into the multi-well plate through these plastic strainers. In some other experiments, 96-well plates with square 7×7 mm wells, instead of round wells, were used to contain the cells and beads. Both of these approaches were found to increase the uniformity of cell and bead loading into the microwells within the wells. FIG. 12 depicts a photograph of numerous beads loaded into microwells using both strainers and square wells. Each light sphere represents a bead loaded into a microwell and a dark spot, three of which are identified in the lower left portion, are microwells without a bead. As can also be seen, no bead is positioned between a microwell; each bead depicted is within a microwell.

In some experiments, beads were removed from microwells at the end of an assay by adding an iodixanol solution (e.g., OptiPrep™ density gradient medium by Sigma) to increase the density of the medium to 1.16 g/cm$^3$, making the beads positively buoyant. A brief low-speed centrifugation was used to force the OptiPrep under the beads and to facilitate their removal.

Example 6

Determination of Efficiency of Sealing Microwells by Beads, Dynamics of Concentrations of Molecules Released from Beads into Microwells, and Concentration of Cross-Talk Between Adjacent Microwells In some numerical simulations, modeling software, such as Comsol Multiphysics, was used to perform numerical simulations of the dynamics of the concentration of small molecules with porous beads and microwells. The beads were modeled as spheres made of a material with a low, spatially uniform diffusion coefficient, $D_b$. The diffusion coefficient in the aqueous medium around beads ("$D_m$") was taken as 425 µm$^2$/s, which may be typical for small molecules, such as fluorescein. The material of the microwell array was considered impermeable for the diffusion. When a bead with an initial uniform concentration of 100% (pre-soaked in fluorescent dye) was placed on a solid substrate under a thick layer of medium, it takes the time $t_{1/2}$, for the mean concentration inside the bead to decrease to 50%. The time $t_{1/2}$ is inversely proportional to $D_b$.

The time $t_{1/2}$=90 min measured for 225 µm diameter beads pre-soaked in fluorescein, as seen in FIG. 10, described above, corresponds to $D_b$=0.125 µm$^2$/s, a 15,000-fold slower diffusion as compared with water. For the same beads pre-soaked in rhodamine 6G, the time $t_{1/2}$=400 min, as measured and shown in FIG. 10, corresponds to $D_b$=0.028 µm$^2$/s, an 18,000-fold slower diffusion as compared with water. Next, a numerical simulation was performed with a 225 µm diameter bead with $D_b$=0.125 µm$^2$/s (corresponding to fluorescein) in a conical microwell with dimensions of a 200 µm depth, the diameter of 140 µm at the bottom, and the opening angle of 34°. The initial conditions were 100% concentration of fluorescein in the microwell under the bead and zero concentration elsewhere. For a bead tightly sealing the volume under the bead, the time of reduction of concentration to 50%, defined as the elution time, $t_{el}$, was approximately 50 min. When there was a gap as narrow as 0.05 µm between the bead and microwell sidewalls, the elution time became as short as 6 min.

Figure 13A:
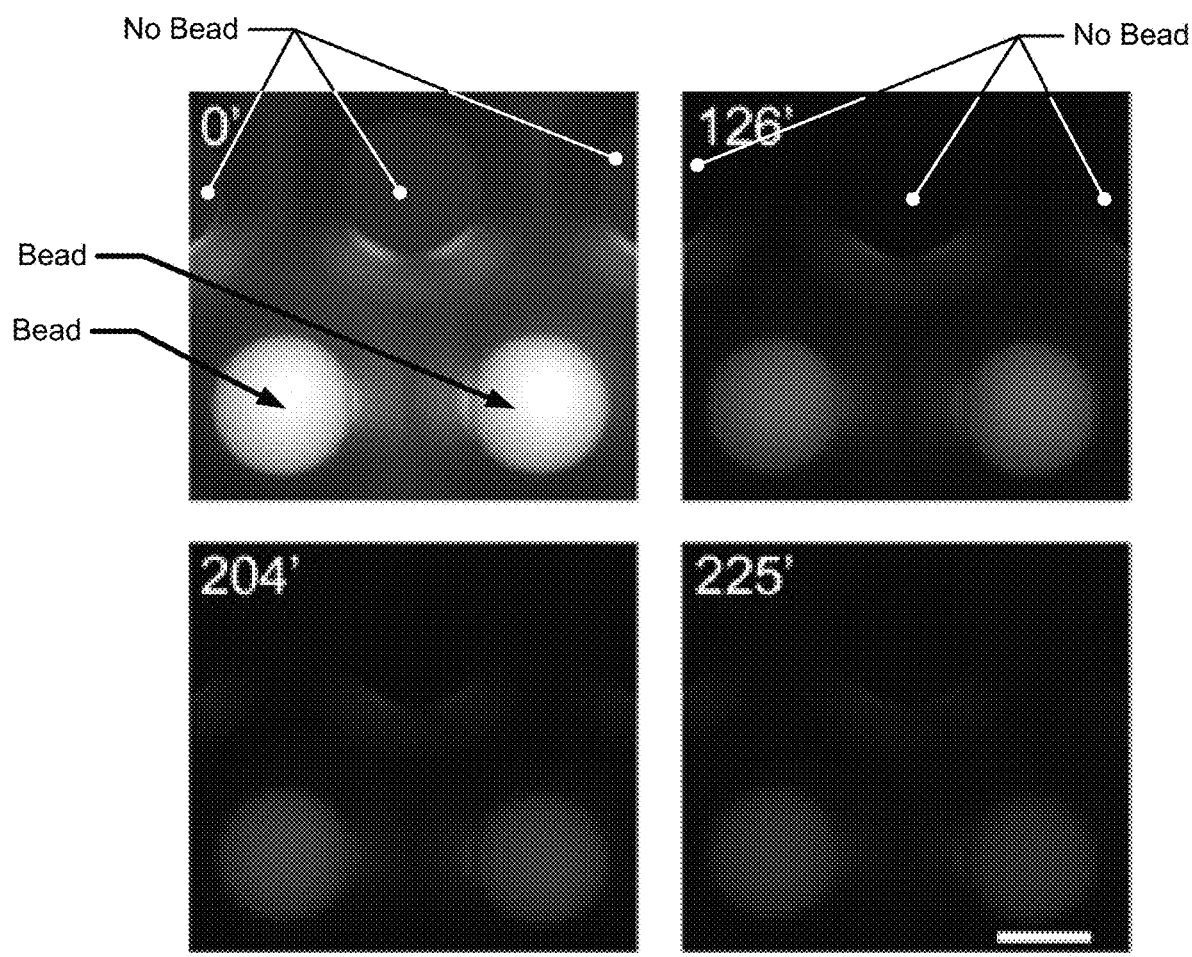
FIGS. 13A and 13B depict elution of fluorescein from microwells sealed with porous hydrogel beads.
Figure 13B:
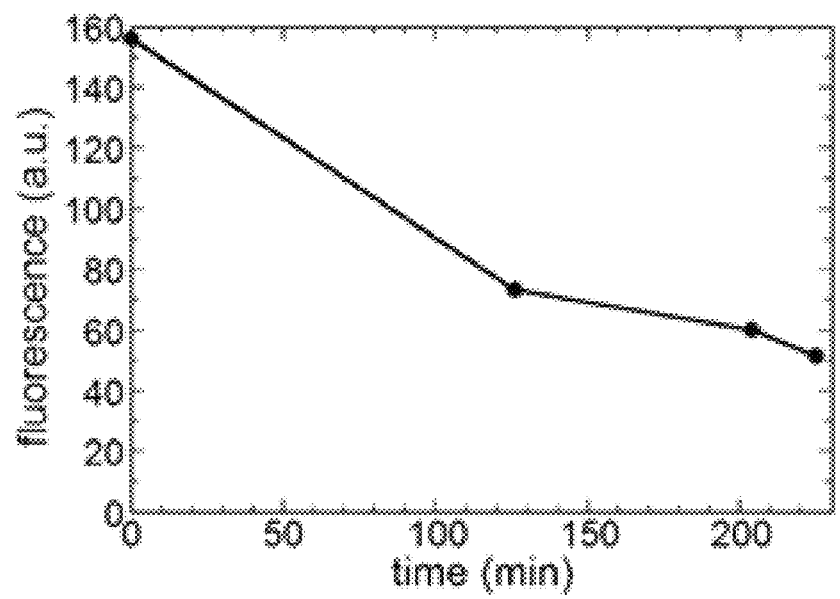

The elution of fluorescein from under beads in microwells was measured by loading a solution of fluorescein into a well of a 96-well plate, loading beads onto the microwell array at the bottom of the well, rapidly exchanging the medium in the well to plain buffer, and observing the fluorescence in microwells under beads as a function of time. FIGS. 13A and 13B depict elution of fluorescein from microwells sealed with porous hydrogel beads. The microwell array was filled with a fluorescein solution, beads were loaded onto the array, and the medium was exchanged to plain buffer. In FIG. 13A, four fluorescent micrographs taken with a 10×/0.30 objective at different time points after the medium exchange, 0 min, 126 min, 201 min, and 225 min. Three microwells at the top of each photograph have no beads and no fluorescein while the two microwells at the bottom of each photograph are sealed with beads and fluorescein. As can be seen, the fluorescein gradually elutes from under the beads as indicated by their decreasing contrast. FIG. 13B depicts the fluorescence in the microwells with beads (in arbitrary units "a.u.") as a function of time.

The dynamics of elution were observed to be consistent between microwells, with $t_{el}$ of approximately 110 min, indicating that the porous beads were sealing the microwells tightly. In some instances, $t_{el}$ was observed to be two times longer than the $t_{el}$ in the simulations. This may be caused by the reduced solubility of fluorescein in the beads vs. water, which was not incorporated into the simulations.

Numerical simulations were also performed with a bead with $D_b$=0.125 µm$^2$/s tightly sealing a microwell and with the initial concentration of fluorescein of 100% in the bead and 0 elsewhere. The simulations indicated that the concentration of fluorescein under the bead increases from 0 to about 40% at 20 min, to about 45% at about 1 hr, and then gradually decays to about 20% at 9.5 hrs, thus remaining in a range between 20% and 45% for 9 hrs, with an average value of ~35%. See also FIGS. 8A and 8B. The simulations suggest that, in some instances, if a bead is loaded with about 3-fold of the standard concentration of a drug (with a correction for the reduced solubility), cells in the microwell under the bead may be exposed to levels of the drug near its standard concentration for as long as 9 hrs.

Additionally, according to a simulation, the concentration of fluorescein near the top on an adjacent microwell (260 µm away from the center of the microwell with the fluorescein-loaded bead) was observed to be <1/1000 of the concentration under the bead, indicating very low drug cross-talk between adjacent microwells. As also seen in FIGS. 8A and 8B, the time dependencies of fluorescein concentration under the bead for beads with two times smaller and two times greater values of $D_b$ were found, in some instances, to have nearly identical shapes, but with times that were, respectively, extended and squeezed by a factor of two. This may suggest, in some embodiments, that when the value of $D_b$ is modified (such as by changing the bead porosity), the characteristic time of exposure of cells to the drug and the area under the curve both change as $1/D_b$, whereas the peak concentration of the drug remains unchanged, suggesting that the drug exposure of cells will be controllable.

The release of material from beads into microwells may also be determined experimentally. In some such experiments, measurements of the release of fluorescent dyes from the beads into microwells may be performed. For some experiments, the release of fluorescent dyes may be close to or match the numerical simulation of FIGS. 8A and 8B. The beads may be presoaked in various fluorescent dyes to saturation, the dye-carrying beads may be mixed with beads with no dye (placebo beads) at a ratio of about 1:20, and this mixture may be washed with buffer (which may remove the residue of dissolved dye), and this mixture may be loaded into a microwell array which was pre-filled with buffer. The concentration of dye under the dye-carrying beads and placebo beads in adjacent microwells may be measured by observing fluorescence near the microwell bottoms under a confocal microscope. The fluorescence may be calibrated by filling the microwell array with a solution of the dye with a known concentration.

The dynamics of concentrations of dyes under beads may follow the curves of the type shown in FIG. 8B and the characteristic times of dye release to be inversely proportional to the values of $D_b$, as measured in experiments on the release of dyes from the beads placed on a flat substrate. The concentrations of dyes under placebo beads may also be <1/1000 of their concentrations under dye-carrying beads and, hence, possibly undetectable. If the dye release times are significantly shorter, or the peak dye concentration is significantly lower than, some predicted by simulations, it may be assumed in some instances that the sealing of microwells by beads in insufficiently tight. The sealing may be improved by fabricating microwell arrays with smoother sidewalls, changing the procedure for making beads, or using centrifugation to push beads deeper into their microwells.

Example 7

Determination of Cell Adhesion, Viability, and Growth in Microwells

Figure 14:
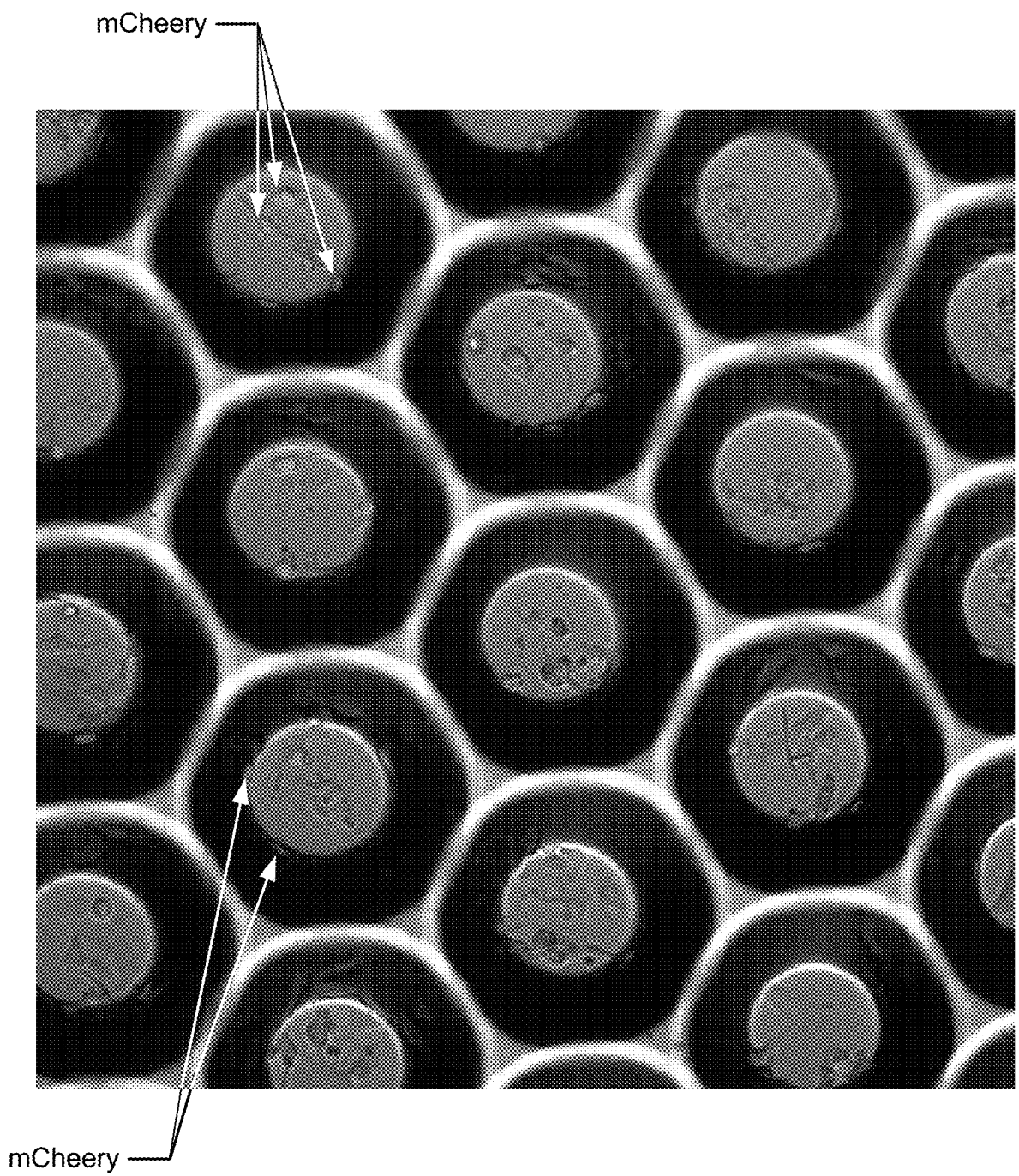
FIG. 14 depicts a photograph of microwells with a human solid cancer-derived cell line (HeLa cells).

In some experiments, cell adhesion, viability, and growth were determined. In some such experiments, the microwells were coated with a molecular coating described above. For example, in some tests, the adhesion and growth of cells was promoted by coating the surface of microwells with collagen I and placing HeLa (a human solid cancer-derived cell line) cells into the microwells. It was observed that these cells adhered to and spread on microwell bottoms and showed good viability for 48 hrs under standard culture conditions, as shown in FIG. 14 which depicts a photograph of microwells with HeLa cells. Here, the HeLa cells are mCherry in nuclei (identified) as intended.

In some experiments, the growth of different cell lines in microwells with different types of molecular coatings may be observed. For instance, two of the cell lines, HeLa and NIH/3T3 (a mouse fibroblast cell line), may be adherent and may tend to grow as monolayers, whereas cells of a third cell line, RAMOS (a human lymphoma-derived cell line), are non-adherent and tend to grow in suspension. The surface of microwells may be coated with a cell matrix protein, collagen I, fibronectin, or laminin, or with a positively charged amino acid poly-L-lysine (using the protocol developed in preliminary studies). Microwell arrays without any coating may be used as a control. Cells may be cultured for 48 hrs using various protocols. Cell culture media may contain LIVE/DEAD® Viability/Cytotoxicity reagent (Invitrogen), for example, to monitor cell viability and growth.

Example 8

Determination of Cell Viability in Microwells with Beads

In some experiments, viability of cells in microwells that are sealed with beads may be determined. In some such experiments, cells may be plated into microwell arrays as in Example 7 above and cultured for 24 hours. The average number of cells may be 5, 10, 20, and 40 cells in each microwell. Beads with different porosities, like described above, may be soaked in 1× phosphate buffered saline ("PBS") and loaded into the array of microwells. Cell viability and cell growth may be monitored as described above, such as using cell culture media that may contain LIVE/DEAD® Viability/Cytotoxicity reagent (Invitrogen).

Example 9

Determining Drug Delivery by Beads to Cells in Microwells

In some experiments HeLa cells may be loaded onto microwell arrays and cultured as described above. Cells in microwells may be exposed to different concentrations of dye Calcein-AM, which become fluorescent inside the cell and accumulates in cells in an amount proportional to its concentration in the medium and to the incubation time. To test drug delivery by beads, beads with fluorescent barcodes described above will be soaked in 0, 1, 10, and 100 μM of the dye. Cells incubated in media with different concentrations of the dye will be used as controls. Two different experiments with dye-carrying beads will be performed.

In a first experiment, the evaluation of drug delivery to cells and the cross-talk between adjacent microwells may be performed. An array of 800 microwells may be loaded with a mix of placebo bead and beads containing various dyes concentrations: 700 beads—0 μM (placebo); 25 beads—1 μM; 25 beads—10 μM; 25 beads—100 μM. The intensity of fluorescence in cells may be examined at 2, 4, 8, and 24 hrs under a microscope (353/466 nm). After 48 hrs beads will be removed as described, and cells will be imaged again.

In a second experiment, the evaluation of contamination from beads that are not in microwells may be performed. HeLa cells will be loaded and cultured as described above. The array of 800 microwells will be loaded with 1,000 placebo beads, which will enter and seal microwells with cells. After that, a mixture of beads containing various dye concentrations will be loaded, all ending up on top of the previously loaded placebo beads: 25 beads—1 μM; 25 beads—10 μM; 25 beads—100 μM. The intensity of fluorescence in cells in placebo bead-sealed microwells at various distances from beads carrying different concentrations of dye will be examined under a microscope at 48 hrs as described above.

If the first experiment shows significant cross-talk, the sealing of microwells by beads may be tightened by applying a low-speed centrifugation, or alternatively, by modifying the microwells and beads. If the second experiment indicates contamination from beads residing on the top of the beads sealing the microwells, then the number of these beads may be minimized.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of screening for activity of target cells, the method comprising:
 a) providing a multiwell device comprising (i) a plurality of microwell arrays; (ii) a plurality of wells, each well of the plurality of wells comprising at least one microwell array located within and at a bottom portion of each well, the at least one microwell array comprising a plurality of microwells and located at the bottom of each well of the multiwell device, wherein the plurality of microwells comprise a corresponding plurality of openings having a polygonal cross-sectional shape and a plurality of top portions, and share a plurality of sidewalls with neighboring microwells;

b) coating the target cells in isotonic medium on the bottom of the plurality of microwells;

c) capping the plurality of microwells with a corresponding plurality of drug-eluting beads under conditions that allow drug to diffuse from the bead to the target cells, wherein the plurality of top portions of the microwells is shaped to receive the corresponding plurality of drug-eluting beads in a spatial order, wherein each bead of the plurality of drug-eluting beads carries a unique drug, and wherein each bead of the plurality of beads is configured to seal into one microwell such that the unique drug carried by the one bead is released to the target cells in the one microwell; and d) detecting drug binding or activation of the target cells.

2. The method of claim 1, wherein the isotonic medium comprises cell culture medium.

3. The method of claim 1, further comprising reducing an ionic strength of the isotonic medium, thereby causing the drug eluting bead to swell in the microwell.

4. The method of claim 1, wherein the drug-eluting bead is uniquely labeled with one or more fluorescing nanoparticles.

5. The method of claim 4, wherein the one or more fluorescing nanoparticles is one or more qDots.

6. The method of claim 1, wherein the drug-eluting bead is made of a hydrogel.

7. The method of claim 6, wherein the hydrogel is of: polyacrylamide (PAA), dextran, polyethylene oxide, UV-cross-linkable polyethylene glycol (PEG), gelatin or poly(D,L)-lactide-co-glycolide (PLGA).

8. The method of claim 1, wherein the drug-eluting beads are made of a hydrocarbon polymer.

9. The method of claim 8, wherein the drug-eluting beads are made of a polystyrene.

10. The method of claim 1, wherein the unique drug is bound to a surface of the drug-eluting bead.

11. The method of claim 1, wherein target cell activity is determined by measuring:
   i) drug binding and/or drug intake into the target cells;
   ii) intracellular calcium release;
   iii) G protein-coupled receptor activation;
   iv) intracellular signaling cascades; and/or
   v) transcriptional activity.

12. The method of claim 1, further comprising: e) after (c) and before (d), exposing the microwells to fluorescence excitation and collecting fluorescence emission from the beads in the microwells.

13. The method of claim 12, further comprising: f) after (e), correlating the fluorescence emission from the beads in the microwells with the location of each drug associated with the beads in the microwells.

14. The method of claim 13, further comprising: g) after (d), correlating the detected drug binding or activation of the target cells in the microwells with the unique drug of the bead positioned in each of microwells of the target cells.

15. The method of claim 12, wherein the exposing further comprises exposing the microwells to fluorescence excitation derived from a laser.

16. The method of claim 1, wherein a diameter and a depth of each microwell of the plurality of microwells is in a range of about 7 μm to about 1 mm.

17. The method of claim 1, further comprising applying a solidifying substance to the plurality of top portions to form a removable monolith having an array of drug-eluting beads corresponding to the spatial order.

* * * * *